(12) United States Patent
Kobayashi

(10) Patent No.: US 10,742,911 B2
(45) Date of Patent: Aug. 11, 2020

(54) RADIATION IMAGING APPARATUS, CONTROL METHOD FOR RADIATION IMAGING APPARATUS, AND NON-TRANSITORY COMPUTER-READABLE STORAGE MEDIUM

(71) Applicant: CANON KABUSHIKI KAISHA, Tokyo (JP)

(72) Inventor: Shigeo Kobayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/244,292

(22) Filed: Jan. 10, 2019

(65) Prior Publication Data

US 2019/0222782 A1   Jul. 18, 2019

(30) Foreign Application Priority Data

Jan. 17, 2018   (JP) ................................ 2018-005946

(51) Int. Cl.
*H04N 5/361* (2011.01)
*H04N 5/355* (2011.01)
(Continued)

(52) U.S. Cl.
CPC .............. *H04N 5/361* (2013.01); *G01T 1/17* (2013.01); *G01T 1/24* (2013.01); *H04N 5/32* (2013.01);
(Continued)

(58) Field of Classification Search
CPC .... H04N 5/2176; H04N 5/2178; H04N 5/361; H04N 5/365; H04N 5/3651; H04N 5/3655; H04N 5/3656; H04N 5/3658; H04N 5/37452; G01T 1/17–178; G01T 1/24–249

See application file for complete search history.

(56) References Cited

U.S. PATENT DOCUMENTS

2014/0029721 A1\*   1/2014   Niwa ....................... H04N 5/32
378/62
2017/0315245 A1\*   11/2017   Yamazaki ................ H04N 5/32
(Continued)

FOREIGN PATENT DOCUMENTS

JP    2014-030151           2/2014
WO   WO2018147217   \*   8/2018   ............... H04N 5/32

*Primary Examiner* — Paul M Berardesca
(74) *Attorney, Agent, or Firm* — Venable LLP

(57) ABSTRACT

A radiation imaging apparatus is provided. The apparatus comprises an image capturing unit and a signal processing unit. The image capturing unit includes a plurality of pixels each including a conversion unit configured to convert radiation into electric charge and a holding unit configured to hold a signal corresponding to electric charge of the conversion unit. The holding unit holds a first signal corresponding to electric charge generated by the conversion unit by one image capturing operation without irradiation with radiation. The signal processing unit generates correction image data based on the plurality of first signals nondestructively read out from the holding unit over a plurality of times while the holding unit holds the first signals, and corrects radiation image data captured by the image capturing unit during irradiation with radiation by using the correction image data.

14 Claims, 15 Drawing Sheets

(51) Int. Cl.
*H04N 5/363* (2011.01)
*G01T 1/17* (2006.01)
*G01T 1/24* (2006.01)
*H04N 5/32* (2006.01)
*H04N 5/3745* (2011.01)
*H04N 5/341* (2011.01)

(52) U.S. Cl.
CPC ........... *H04N 5/341* (2013.01); *H04N 5/3559* (2013.01); *H04N 5/363* (2013.01); *H04N 5/37452* (2013.01)

(56) References Cited

U.S. PATENT DOCUMENTS

| | | | |
|---|---|---|---|
| 2018/0328862 A1* | 11/2018 | Sato | G01T 1/208 |
| 2019/0094394 A1* | 3/2019 | Matsumoto | H04N 5/32 |
| 2019/0230299 A1* | 7/2019 | Ohta | G01N 23/04 |

* cited by examiner

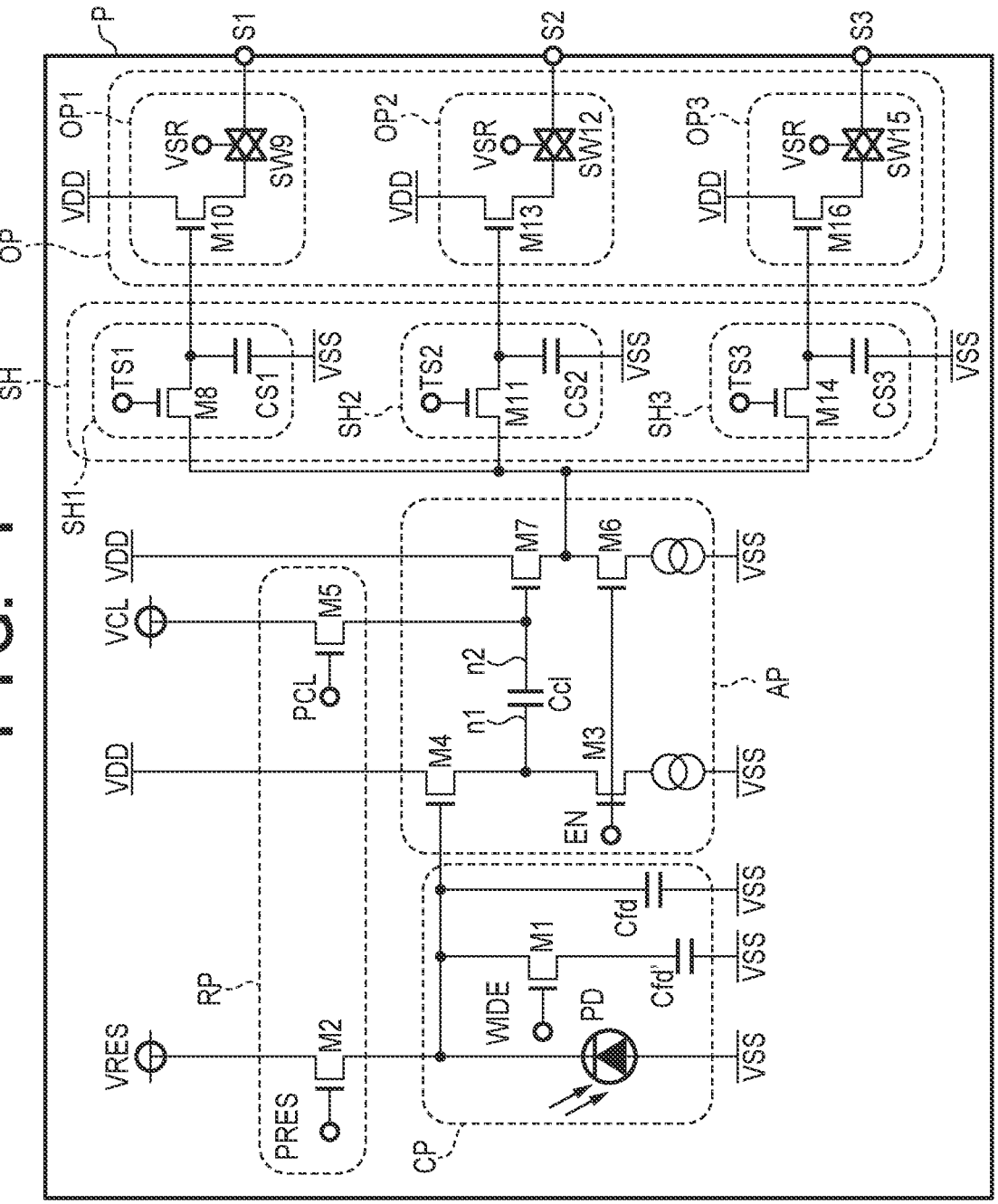

RADIATION IMAGING APPARATUS, CONTROL METHOD FOR RADIATION IMAGING APPARATUS, AND NON-TRANSITORY COMPUTER-READABLE STORAGE MEDIUM

BACKGROUND OF THE INVENTION

Field of the Invention

The present invention relates to a radiation imaging apparatus, a control method for the radiation imaging apparatus, and a non-transitory computer-readable storage medium.

Description of the Related Art

In medical imaging diagnosis and nondestructive inspection, a radiation imaging apparatus using an FPD (Flat Panel Detector) formed from a semiconductor material is widely used. In the FPD, FPN (Fixed Pattern Noise) is caused by dark currents generated in pixels, and variations of semiconductor elements such as transistors constituting pixels and/or signal paths through which signals output from pixels. Japanese Patent Laid-Open No. 2014-30151 discloses how to obtain a plurality of dark current images by image capturing without irradiation with radiation to suppress the influence of FPN and to correct a radiation image by using correction image data obtained by averaging processing of a plurality of dark current images.

SUMMARY OF THE INVENTION

Low-frequency noise (1/f noise) as a type of FPN caused by semiconductor elements constituting signal paths to which signals are output from pixels sometimes exerts more influence on image quality than random noise, causing vertical line and block artifacts in radiation images. To obtain correction image data, in order to more accurately obtain a noise component originating from semiconductor elements arranged on a signal path, it is necessary to obtain a plurality of dark current images. However, in the correction image data generation method disclosed in Japanese Patent Laid-Open No. 2014-30151, with an increase in the number of dark current images used for the generation of correction image data, it requires a longer time to perform image capturing to obtain dark current images. No radiation image can be captured while correction image data is generated. It is therefore required to shorten the time taken to generate correction image data.

Some embodiments of the present invention provide techniques advantageous in shortening the time to generate correction image data.

According to some embodiments, a radiation imaging apparatus comprising: an image capturing unit configured to capture a radiation image, wherein the image capturing unit includes a plurality of pixels each including a conversion unit configured to convert radiation into electric charge and a holding unit configured to hold a signal corresponding to electric charge of the conversion unit, and the holding unit holds a first signal corresponding to electric charge generated by the conversion unit by one image capturing operation without irradiation with radiation; and a signal processing unit, and wherein the signal processing unit generates correction image data based on the plurality of first signals nondestructively read out from the holding unit over a plurality of times while the holding unit holds the first signals, and corrects radiation image data captured by the image capturing unit during irradiation with radiation by using the correction image data, is provided.

According to some other embodiment, a control method for a radiation imaging apparatus including an image capturing unit configured to capture a radiation image and a signal processing unit, wherein the image capturing unit includes a plurality of pixels each including a conversion unit configured to convert radiation into electric charge and a holding unit configured to hold a signal corresponding to electric charge of the conversion unit, wherein the method comprises: causing the holding unit to hold a first signal corresponding to electric charge generated by the conversion unit by one image capturing operation without irradiation with radiation, and causing the signal processing unit to generate correction image data based on the plurality of first signals nondestructively read out from the holding unit over a plurality of times while the holding unit holds the first signals, and causing the signal processing unit to correct radiation image data captured by the image capturing unit during irradiation with radiation by using the correction image data, is provided.

According to still other embodiments, a non-transitory computer-readable storage medium storing a program for causing a computer to execute a control method for a radiation imaging apparatus including an image capturing unit configured to capture a radiation image and a signal processing unit, wherein the image capturing unit includes a plurality of pixels each including a conversion unit configured to convert radiation into electric charge and a holding unit configured to hold a signal corresponding to electric charge of the conversion unit, wherein the method comprises: causing the holding unit to hold a first signal corresponding to electric charge generated by the conversion unit by one image capturing operation without irradiation with radiation, and causing the signal processing unit to generate correction image data based on the plurality of first signals nondestructively read out from the holding unit over a plurality of times while the holding unit holds the first signals, and causing the signal processing unit to correct radiation image data captured by the image capturing unit during irradiation with radiation by using the correction image data, is provided.

Further features of the present invention will become apparent from the following description of exemplary embodiments (with reference to the attached drawings).

BRIEF DESCRIPTION OF THE DRAWINGS

FIG. 1 is an equivalent circuit diagram showing an example of the configuration of a pixel of a radiation imaging apparatus according to an embodiment of the present invention;

DESCRIPTION OF THE EMBODIMENTS

Figure 2A:
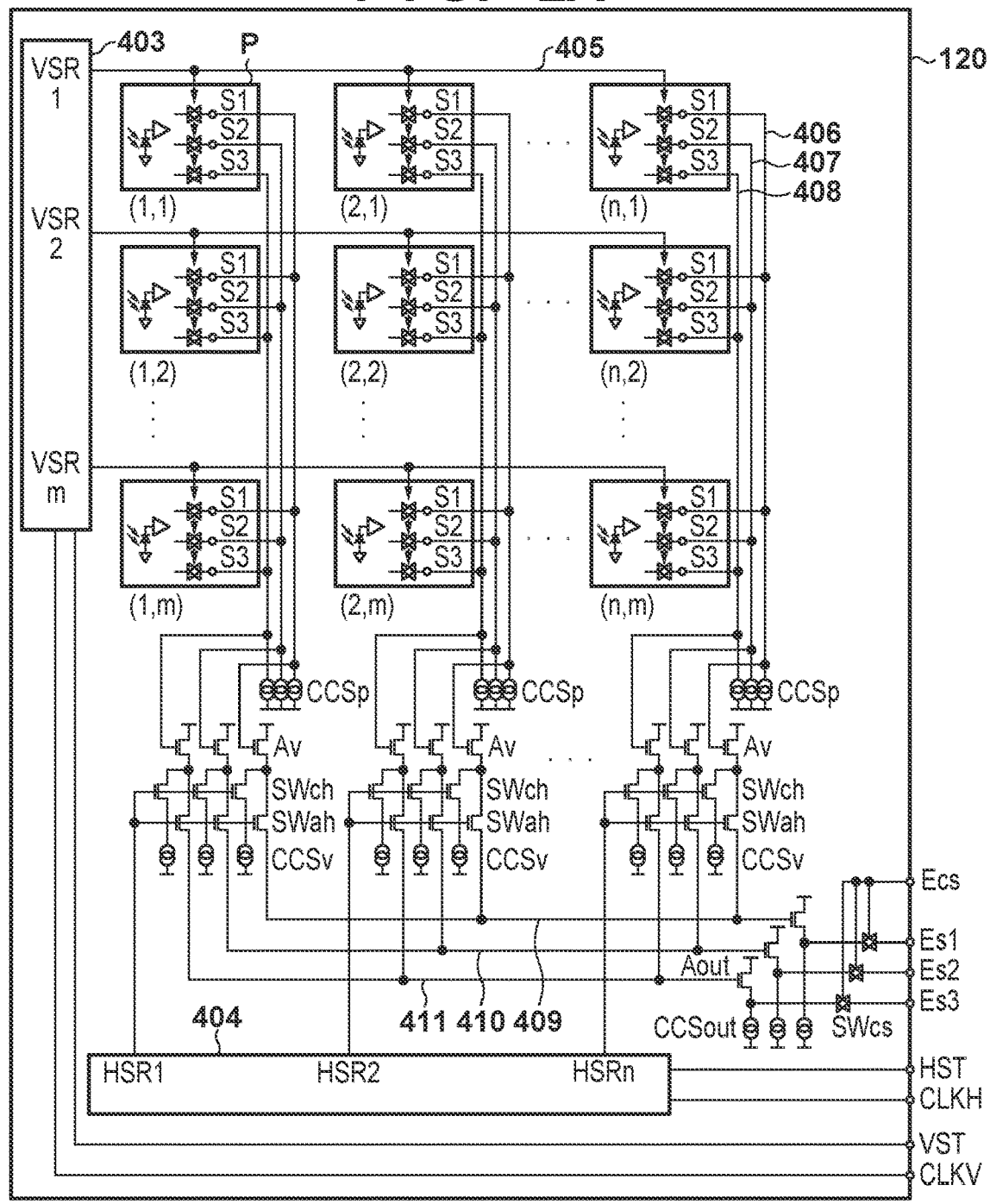
FIGS. 2A and 2B are equivalent circuit diagrams showing an example of the configurations of a pixel array and a readout unit of the radiation imaging apparatus in FIG. 1.

Concrete embodiments of a radiation imaging apparatus according to the present invention will be described with reference to the accompanying drawings. In the following description and drawings, common reference numerals denote common components throughout a plurality of drawings. Accordingly, the common components will be described by cross-referring to a plurality of drawings, and a description of components denoted by common reference numerals will appropriately be omitted. In addition, radiation according to the present invention can include not only α-rays, β-rays, and γ-rays that are beams generated by particles (including photons) emitted by radioactive decay but also beams having energy equal to or higher than the energy of these beams, for example, X-rays, particle rays, and cosmic rays.

The configuration of a radiation imaging apparatus and a control method (driving method) according to the first embodiment of the present invention will be described with reference to FIGS. 1 to 7. FIG. 1 is an equivalent circuit diagram showing an example of the configuration of each pixel P arrayed in a pixel array of an image capturing unit 150 for detecting and capturing an image of radiation in a radiation imaging apparatus 100 according to the present invention. The pixel P includes a conversion unit CP, an amplification unit AP, a reset unit RP, holding units SH, that is, SH1 to SH3, and output units OP, that is, OP1 to OP3. In this embodiment, the configuration of each of these components of the pixel P is implemented by an electronic circuit. For example, the conversion unit CP is implemented by a conversion circuit.

The conversion unit CP for converting radiation into electric charge includes a photodiode PD, a transistor M1, an FD (Floating Diffusion) capacitor Cfd, and an additional capacitor Cfd' for sensitivity switching. The photodiode PD is a photoelectric conversion element, which converts light generated by a scintillator (not shown) as a wavelength conversion element in accordance with radiation incident on the scintillator into electric charge. That is, a conversion element for converting radiation into signal electric charge is implemented by a scintillator that converts radiation into light and a photodiode that converts light into electric charge. Each conversion element is not limited to a combination of a wavelength conversion element and a photoelectric conversion element. For example, as a conversion element, an element that directly converts radiation into electric charge may be used. The photodiode PD generates electric charge in accordance with radiation incident on the conversion unit CP. The voltage of the FD capacitor Cfd which corresponds to the amount of electric charge generated is output to the amplification unit AP. In addition, the additional capacitor Cfd' for sensitivity switching is used to switch the sensitivities of the pixel P in accordance with radiation, and is connected to the photodiode PD via the transistor M1 as a switching element. When a signal WIDE is activated, the transistor M1 is rendered conductive, and the voltage of the combined capacitor of the FD capacitor Cfd and the additional capacitor Cfd' which corresponds to the amount of electric charge generated in the photodiode PD is output to the amplification unit AP. That is, controlling the conduction state of the transistor M1 enables the conversion unit CP to detect radiation with two types of sensitivities. In this embodiment, the conversion unit CP of the pixel P detects radiation with two types of sensitivities by providing one additional capacitor Cfd'. However, the conversion unit CP may be configured to detect radiation with more types of sensitivities by providing two or more additional capacitors Cfd'.

The amplification unit AP arranged between the conversion unit CP and the holding units SH includes a control transistor M3, an amplification transistor M4, a clamp capacitor Ccl constituting a clamp circuit, a control transistor M6, an amplification transistor M7, and a plurality of constant current sources. The control transistor M3, the amplification transistor M4, and the constant current source (for example, a transistor having a current mirror configuration) are connected in series to form a current path. When a signal EN input to the gate of the control transistor M3 is activated, the amplification transistor M4 that receives a voltage from the conversion unit CP is enabled. This forms a source-follower circuit to cause the amplification transistor M4 to output the voltage obtained by amplifying a voltage from the conversion unit CP. The voltage output from the amplification transistor M4 is input to the amplification transistor M7 via the clamp capacitor Ccl. The control transistor M6, the amplification transistor M7, and the constant current source are connected in series to form a current path. When the signal EN input to the gate of the control transistor M6 is activated, the amplification transistor M7 that receives a voltage from the amplification transistor M4 is enabled. This forms a source-follower circuit to cause the amplification transistor M7 to output the voltage obtained by amplifying a voltage from the amplification transistor M4. The clamp capacitor Ccl is arranged in series between the amplification transistor M4 and the amplification transistor M7. The clamping operation by clamp capacitor Ccl will be described, together with the reset unit RP to be described next.

The reset unit RP includes a reset transistor M2 and a reset transistor M5. When a signal PRES is activated, the reset transistor M2 supplies a predetermined potential to the photodiode PD. This resets (initializes) the electric charge of the photodiode PD and resets the voltage output to the amplification unit AP. The reset transistor M5 supplies a predetermined potential to a connection node n2 between the clamp capacitor Ccl and the amplification transistor M7. This resets the voltage output from the amplification transistor M7. A voltage corresponding to a voltage from the conversion unit CP at the time of resetting by the reset transistor M2 is input to a node n1 on the input terminal side of the clamp capacitor Ccl. In addition, activating a clamp signal PCL renders the reset transistor M5 conductive to input a clamp voltage VCL as a predetermined potential to the node n2 on the output terminal side of the clamp capacitor Ccl. In this manner, a potential difference caused between the two terminals of the clamp capacitor Ccl is clamped as a noise component, and a voltage that has changed accompanying the generation and accumulation of electric charge in the photodiode PD caused by irradiation with radiation is then output as a signal component. This is a clamping operation using the clamp capacitor Ccl. The clamping operation suppresses noise components such as kTC noise caused by the conversion unit CP and the offset of the amplification transistor M4.

The conversion unit CP and the amplification unit AP constitute a signal generating unit that generates a signal based on electric charge generated and accumulated in accordance with radiation. In this case, this signal will be referred to as an accumulation signal. In addition, a signal generated by the signal generating unit upon making the reset unit RP reset the signal generating unit to a state before electric charge accumulation will be referred to as a reset signal. As described above, the signal generating unit is reset by resetting the potential of the photodiode PD and the potential of the node n2 on the output terminal side of the clamp capacitor Ccl. In this case, a signal output from the amplification unit AP will be referred to as a pixel signal. The pixel signal includes the accumulation signal and the reset signal generated by the signal generating unit.

The pixel P shown in FIG. 1 includes the three holding units SH1 to SH3 as the holding units SH that hold a signal corresponding to the electric charge of the conversion unit CP. The holding unit SH1 is a portion that can hold a pixel signal output from the conversion unit CP via the amplification unit AP, and is a sample/hold circuit including a transfer transistor M8 and a holding capacitor CS1. More specifically, switching the state (conductive state or nonconductive state) of the transfer transistor M8 by using a sample/hold control signal TS1 performs the sampling operation of transferring a pixel signal to the holding capacitor CS1 and holding the signal.

The pixel P shown in FIG. 1 includes the three output units OP1 to OP3 respectively corresponding to the three holding units SH1 to SH3 as output units OP for outputting signals held in the holding units SH to a column signal line. The output unit OP1 includes a signal amplification transistor M10 and an output switch SW9. The signal amplification transistor M10 is a transistor for amplifying and outputting the pixel signal held in the holding capacitor CS1. The output switch SW9 is a switch for transferring the pixel signal output from the signal amplification transistor M10. More specifically, the output switch SW9 is rendered conductive in accordance with a vertical scanning signal VSR input to the output switch SW9 to form a source-follower circuit together with a constant current source CCSp and the signal amplification transistor M10, located on the subsequent stage, which are connected to the output switch SW9 via a column signal line 406 (to be described later). With this operation, the pixel signal held in the holding unit SH1 is amplified by the output unit OP1 and output from the pixel P to the column signal line 406. In this case, the pixel signal output from the output unit OP1 of the pixel P and amplified will be referred to as a pixel signal S1. In addition, when the pixel signal is an accumulation signal, the signal will be referred to as the accumulation signal S1. When the pixel signal is a reset signal, the signal will be referred to as the reset signal S1.

The holding unit SH2 is a portion that can hold the pixel signal output from the conversion unit CP via the amplification unit AP, and is a sample/hold circuit including a transfer transistor M11 and a holding capacitor CS2. More specifically, switching the state (conductive state or nonconductive state) of the transfer transistor M11 by using a sample/hold control signal TS2 performs the sampling operation of transferring a pixel signal to the holding capacitor CS2 and holding the signal.

The output unit OP2 includes a signal amplification transistor M13 and an output switch SW12. The signal amplification transistor M13 is a transistor for amplifying and outputting the pixel signal held in the holding capacitor CS2. The output switch SW12 is a switch for transferring the pixel signal output from the signal amplification transistor M13. More specifically, the output switch SW12 is rendered conductive in accordance with the vertical scanning signal VSR input to the output switch SW12 to form a source-follower circuit together with a constant current source CCSp and the signal amplification transistor M13, located on the subsequent stage, which are connected to the output switch SW12 via a column signal line 407 (to be described later). With this operation, the pixel signal held in the holding unit SH2 is amplified by the output unit OP2 and output from the pixel P to the column signal line 407. In this case, the pixel signal output from the output unit OP2 of the pixel P and amplified will be referred to as a pixel signal S2. In addition, when the pixel signal is an accumulation signal, the signal will be referred to as the accumulation signal S2. When the pixel signal is a reset signal, the signal will be referred to as the reset signal S2.

The holding unit SH3 is a portion that can hold the pixel signal output from the conversion unit CP via the amplification unit AP, and is a sample/hold circuit including a transfer transistor M14 and a holding capacitor CS3. More specifically, switching the state (conductive state or nonconductive state) of the transfer transistor M14 by using a sample/hold control signal TS3 performs the sampling operation of transferring a pixel signal to the holding capacitor CS3 and holding the signal.

The output unit OP3 includes a signal amplification transistor M16 and an output switch SW15. The signal amplification transistor M16 is a transistor for amplifying and outputting the pixel signal held in the holding capacitor CS3. The output switch SW15 is a switch for transferring the pixel signal output from the signal amplification transistor M16. More specifically, the output switch SW15 is rendered conductive in accordance with the vertical scanning signal VSR input to the output switch SW15 to form a source-follower circuit together with the constant current source CCSp and the signal amplification transistor M16, located on the subsequent stage, which are connected to the output switch SW15 via a column signal line 408 (to be described later). With this operation, the pixel signal held in the holding unit SH3 is amplified by the output unit OP3 and output from the pixel P to the column signal line 408. In this case, the pixel signal output from the output unit OP3 of the pixel P and amplified will be referred to as a pixel signal S3. In addition, when the pixel signal is an accumulation signal, the signal will be referred to as the accumulation signal S3. When this signal is a reset signal, the signal will be referred to as the reset signal S3.

After sampling/holding by the holding capacitors CS1, CS2, and CS3, the transfer transistors M8, M11, and M14 are turned off, and the holding capacitors CS1, CS2, and CS3 are disconnected from the amplification unit AP on the preceding stage. This makes it possible to nondestructively read out the held pixel signals (accumulation signals and reset signals) until they are sampled/held again.

In this embodiment, the three holding units SH1 to SH3 and the three output units OP1 to OP3 are provided to hold two types of signals, namely an accumulation signal and a reset signal, in accordance with one additional capacitor Cfd'. However, this is not exhaustive. The embodiment may include two or four or more holding units SH and two or four or more output units OP.

Figure 2B:
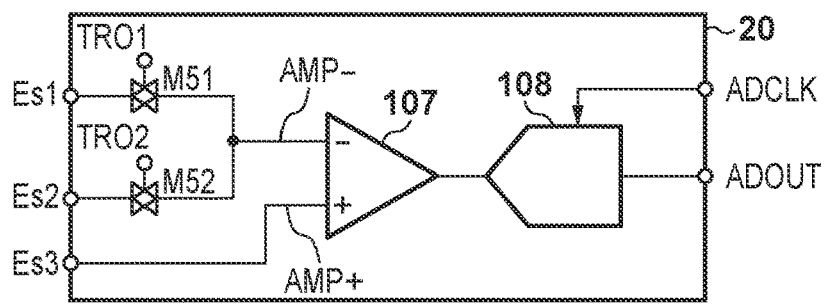

A pixel array 120 and a signal readout unit 20 of the image capturing unit 150 of the radiation imaging apparatus 100 according to this embodiment will be described next with reference to FIGS. 2A and 2B. The pixel array 120 of the image capturing unit 150 according to the embodiment will be described first with reference to FIG. 2A. FIG. 2A is an equivalent circuit diagram for explaining the schematic configuration of the pixel array 120 of the image capturing unit 150 according to the embodiment. A plurality of pixels P each shown in FIG. 1 are arrayed in a two-dimensional array to form the pixel array 120. The signal readout unit 20 reads out signals from the pixel array 120.

The pixel array 120 includes a plurality of pixels P, a vertical scanning circuit 403, a horizontal scanning circuit 404. The vertical scanning circuit 403 and the horizontal scanning circuit 404 are implemented by, for example, shift registers, and operate as readout units for reading out signals from the pixels P based on control signals from a panel control unit 109 (to be described later). The vertical scanning circuit 403 supplies the vertical scanning signal VSR to the pixels P via a control line 405, and drives the pixels P for each row based on the vertical scanning signal VSR. That is, the vertical scanning circuit 403 functions as a row selection unit to select, for each row, the pixels P from which signals are to be read out. In addition, the horizontal scanning circuit 404 functions as a column selection unit to select, for each column, the pixels P based on a horizontal scanning signal HSR, and sequentially outputs signals from the pixels P (horizontal transfer). In this case, the operating frequency of the row selection unit (vertical scanning circuit 403) is lower than that of the column selection unit (horizontal scanning circuit 404). That is, the row selection unit (vertical scanning circuit 403) operates slower than the column selection unit (horizontal scanning circuit 404).

The pixel array 120 includes a terminal Es1 for reading out pixel signals held in the holding capacitors CS1 of the pixels P, a terminal Es2 for reading out pixel signals held in the holding capacitors CS2, and a terminal Es3 for reading out pixel signals held in the holding capacitors CS3. In addition, the pixel array 120 further includes a select terminal Ecs. The signals received by the select terminal Ecs are activated to read out pixel signals from the respective pixels P of the pixel array 120 via the terminals Es1, Es2, and Es3. More specifically, the pixel signals S1, S2, and S3 from the pixels P described above are respectively supplied to the column signal lines 406 to 408 corresponding to the respective terminals.

Each control transistors SWch, each amplification transistor Av, and each constant current source CCSv are connected in series to form a current path. The outputs of the amplification transistors Av are respectively connected to analog signal lines 409 to 411 via transfer transistors SWah that are rendered conductive in response to the horizontal scanning signal HSR from the horizontal scanning circuit 404. When the horizontal scanning signals HSR input to the gates of the control transistors SWch are activated, the amplification transistors Av that respectively receive voltages from the column signal lines 406 to 408 are enabled. In this manner, a source-follower circuit is formed to output the voltages obtained by amplifying voltages from the column signal lines 406 to 408 to the analog signal lines 409 to 411 via the transfer transistors SWah that are rendered conductive in response to the horizontal scanning signals HSR.

Each amplification transistor Aout and each constant current source CCSout are connected in series so as to form a current path, thereby forming a source-follower circuit in an enabled state. With this operation, the voltages obtained by amplifying voltages from the analog signal lines 409 to 411 are output from the terminals Es1, Es2, and Es3 via the transfer transistors SWch that are rendered conductive in response to the signal received by the terminal Ecs.

The pixel array 120 also has terminals HST, CLKH, VST and CLKV that receive control signals for controlling the vertical scanning circuit 403 and the horizontal scanning circuit 404. The terminal HST receives a start pulse to be input to the horizontal scanning circuit 404. The terminal CLKH receives a clock signal to be input to the horizontal scanning circuit 404. The terminal VST receives a start pulse to be input to the vertical scanning circuit 403. The terminal CLKV receives a clock signal to be input to the vertical scanning circuit 403. These control signals are input from the panel control unit 109 (to be described later). The horizontal scanning circuit 404 generates and outputs the horizontal scanning signal HSR based on an input start pulse and an input clock signal. The vertical scanning circuit 403 generates and outputs the vertical scanning signal VSR based on an input start pulse and an input clock signal. With this operation, the pixel signals S1, S2, and S3 are sequentially read out from each pixel P in the X-Y address scheme. That is, in the pixel array 120, the pixels P are controlled for each row, and the signals held in the respective holding units are output (horizontally transferred) for each column, thereby reading out signals.

The signal readout unit 20 of the radiation imaging apparatus according to this embodiment will be described next with reference to FIG. 2B. FIG. 2B is an equivalent circuit diagram for explaining the schematic configuration of the signal readout unit 20 of the radiation imaging apparatus according to the embodiment. The signal readout unit 20 includes, for example, a signal amplification unit 107 including a differential amplifier and an A/D conversion unit 108 for performing A/D conversion.

The pixel signal S3 from the terminal Es3 is input to a noninversion input terminal AMP+ of the signal amplification unit 107. The pixel signal S1 from the terminal Es1 is input to an inversion input terminal AMP− of the signal amplification unit 107 via a switch M51 that is rendered conductive in response to a control signal TRO1 input to the control terminal. The pixel signal S2 from the terminal Es2 is input to the inversion input terminal AMP− via a switch M52 that is rendered conductive in response to a control signal TRO2 input to the control terminal. The switch M51 and the switch M52 are controlled so as to input a signal from one of the terminals Es1 and Es2 to the inversion input terminal AMP−. The switch M51, the switch M52, and the signal amplification unit 107 can be designed to have response characteristics that can follow the period of a signal ADCLK.

The signal amplification unit 107 amplifies the difference between a signal from the terminal Es1 and a signal from the terminal Es3 or the difference between a signal from terminal Es2 and a signal from the terminal Es3. The A/D conversion unit 108 AD-converts this difference based on a clock signal input via the terminal ADCLK. With this configuration, an image signal (digital data) is obtained from the pixel array 120 and is output to the panel control unit 109 (to be described later) via a terminal ADOUT.

Figure 3:
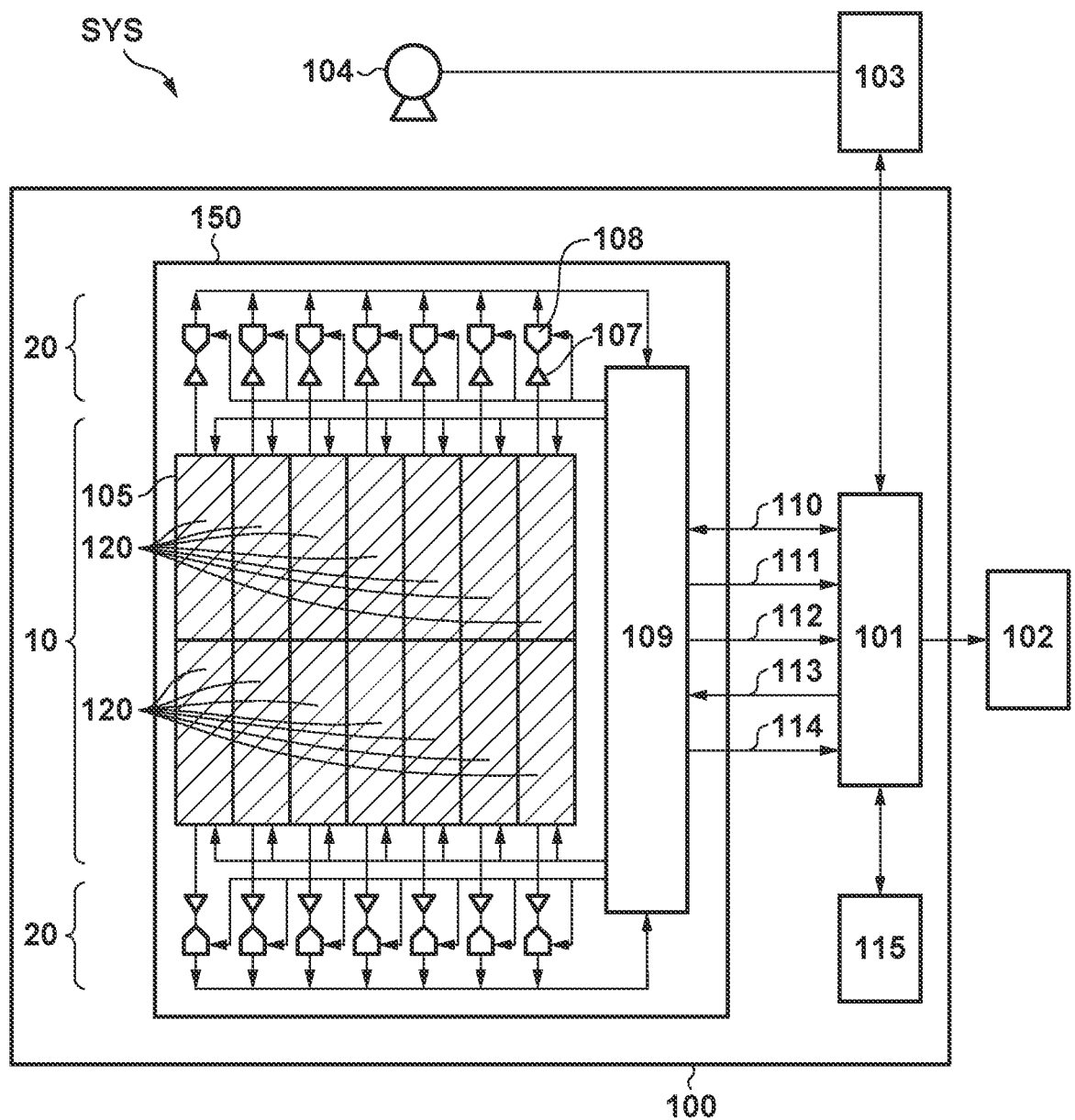
FIG. 3 is a circuit diagram showing an example of the configuration of a radiation imaging system using the radiation imaging apparatus in FIG. 1.

A radiation imaging system SYS according to this embodiment will be described next with reference to FIG. 3. FIG. 3 is a schematic view for explaining the schematic configurations of the image capturing unit 150 and a radiation generation apparatus 104 of the radiation imaging system SYS according to the embodiment.

The radiation imaging system SYS includes the radiation imaging apparatus 100 including a signal processing unit 101 and the image capturing unit 150, the radiation generation apparatus 104 for irradiating the image capturing unit 150 with radiation, an irradiation control unit 103, and a display unit 102 such as a display. In capturing a radiation image, the signal processing unit 101 can synchronously control the image capturing unit 150 and the irradiation control unit 103. The image capturing unit 150 generates a signal based on radiation passing through an object. The signal processing unit 101 and the like perform predetermined processing for this signal, thereby generating image data based on the radiation. The image data is displayed as a radiation image on the display unit 102. The image capturing unit 150 includes an image capturing panel 105 having an image capturing area 10, the signal readout unit 20 that outputs a signal from the image capturing area 10 to the panel control unit 109, and the panel control unit 109 that controls each constituent element in accordance with the signal processing unit 101.

The image capturing panel 105 can be formed by tiling (two-dimensionally arraying) a plurality of pixel arrays 120, each having a plurality of pixels P arranged, on a plate-like base. Such configuration forms the large image capturing panel 105. As described above, the plurality of pixels P are arranged on each pixel array 120, and the image capturing area 10 can be said to include the plurality of pixels P arrayed to form a plurality of rows and a plurality of columns of the pixel arrays 120. In addition, this embodiment has exemplified the configuration in which the plurality of pixel arrays 120 are tiled to form 7 columns×2 rows. However, the embodiment is not limited to this configuration.

The panel control unit 109 communicates control commands and synchronization signals with, for example, the signal processing unit 101, and also outputs, to the signal processing unit 101, the signals generated by the pixels P by irradiation with radiation. In addition, the panel control unit 109 controls the image capturing area 10 and each constituent element. For example, the panel control unit 109 performs setting of a reference voltage for the pixel arrays 120, driving control of the pixels, and operation mode control in accordance with control commands input from the signal processing unit 101. In addition, the panel control unit 109 combines signals (digital data) from the pixel arrays 120, which are A/D-converted by the A/D conversion unit 108 of the signal readout unit 20, into one frame data and outputs it to the signal processing unit 101. The panel control unit 109 may be constituted by a processor such as a CPU and a memory such as a RAM or ROM. The operation of the image capturing unit 150 (to be described later) may be executed by causing the processor of the panel control unit 109 to execute a program stored in the memory. Alternatively, the panel control unit 109 may be implemented by a dedicated circuit such as an ASIC (Application Specific Integrated Circuit).

The panel control unit 109 and the signal processing unit 101 exchange control commands, control signals, and image signals via various types of interfaces. The signal processing unit 101 outputs setting information such as an operation mode and various types of parameters set by the user and image capturing information to the panel control unit 109 via a control interface 110. For this purpose, the signal processing unit 101 may include a user interface for allowing the user to make various types of settings with respect to the radiation imaging system SYS. The panel control unit 109 outputs apparatus information such as the operation state of the image capturing unit 150 to the signal processing unit 101 via the control interface 110. The panel control unit 109 also outputs the image signal obtained by the image capturing unit 150 to the signal processing unit 101 via an image data interface 111. In addition, the panel control unit 109 notifies the signal processing unit 101 that the image capturing unit 150 has entered a state where image capturing is possible by using a READY signal 112. By using a synchronization signal 113, the signal processing unit 101 notifies the panel control unit 109 of the timing of the start of irradiation with radiation in response to the READY signal 112 from the panel control unit 109. An irradiation permission signal 114 is a signal for notifying the signal processing unit 101 that the image capturing panel 105 is accumulating electric charge. The signal processing unit 101 outputs a control signal to the irradiation control unit 103 to start irradiation with radiation while the irradiation permission signal 114 is in an enabled state.

A control method (driving method) for the radiation imaging system SYS described above will be described next with reference to the timing charts shown in FIGS. 4 and 5. The panel control unit 109 executes this control method by controlling the operation of each constituent element of the image capturing unit 150. The image capturing unit 150 generates a plurality of accumulation images for generating correction image data without irradiation with radiation by using the driving method shown in FIG. 4. The image capturing unit 150 also captures a moving image constituted by images captured in a plurality of frames during irradiation with radiation by using the driving method shown in FIG. 5. In this case, an accumulation image is an image generated based on the accumulation signal read out from each pixel.

Figure 4:
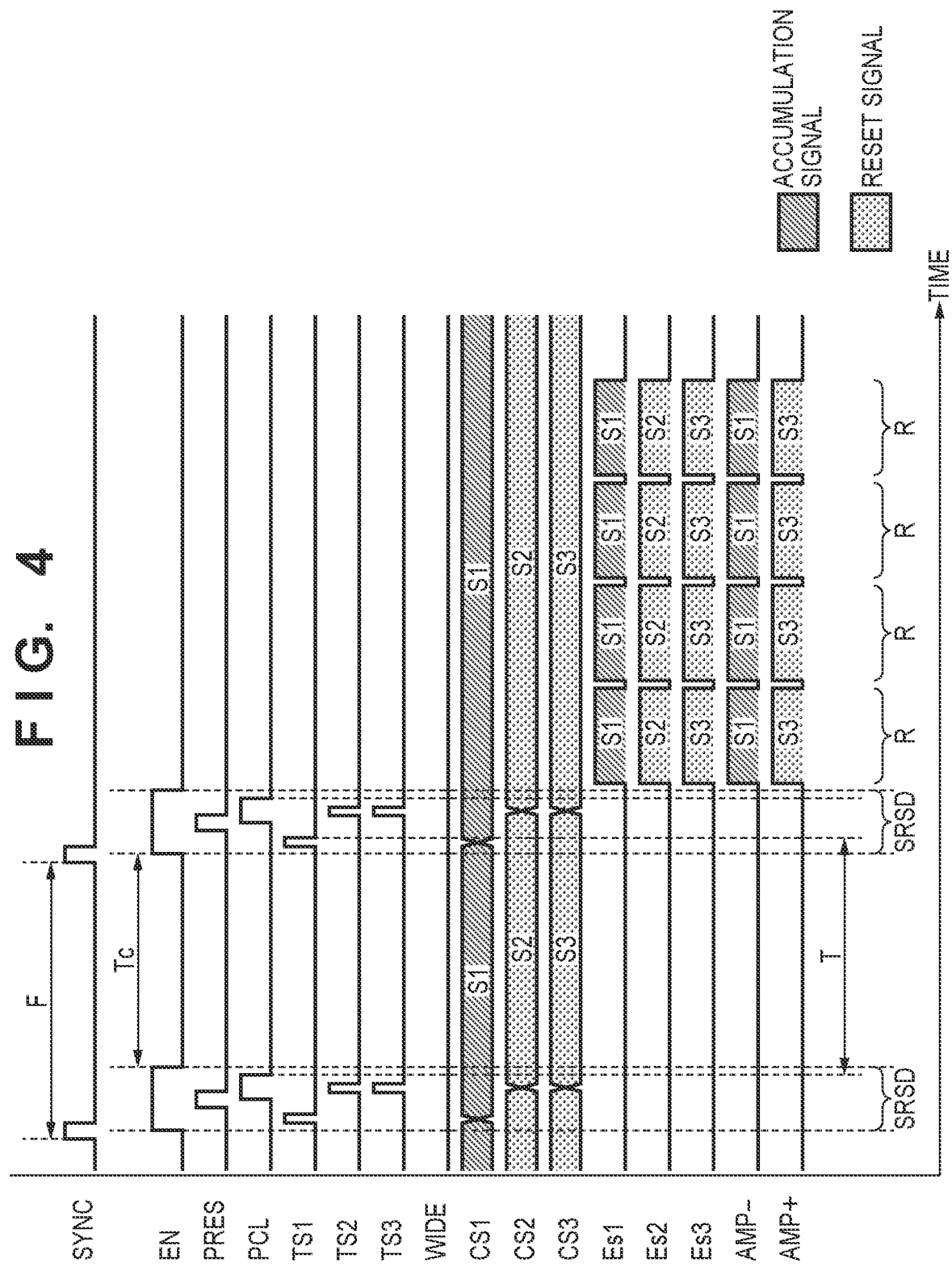
FIG. 4 is a timing chart showing a driving method for generating correction image data using the radiation imaging apparatus in FIG. 1.
Figure 5:
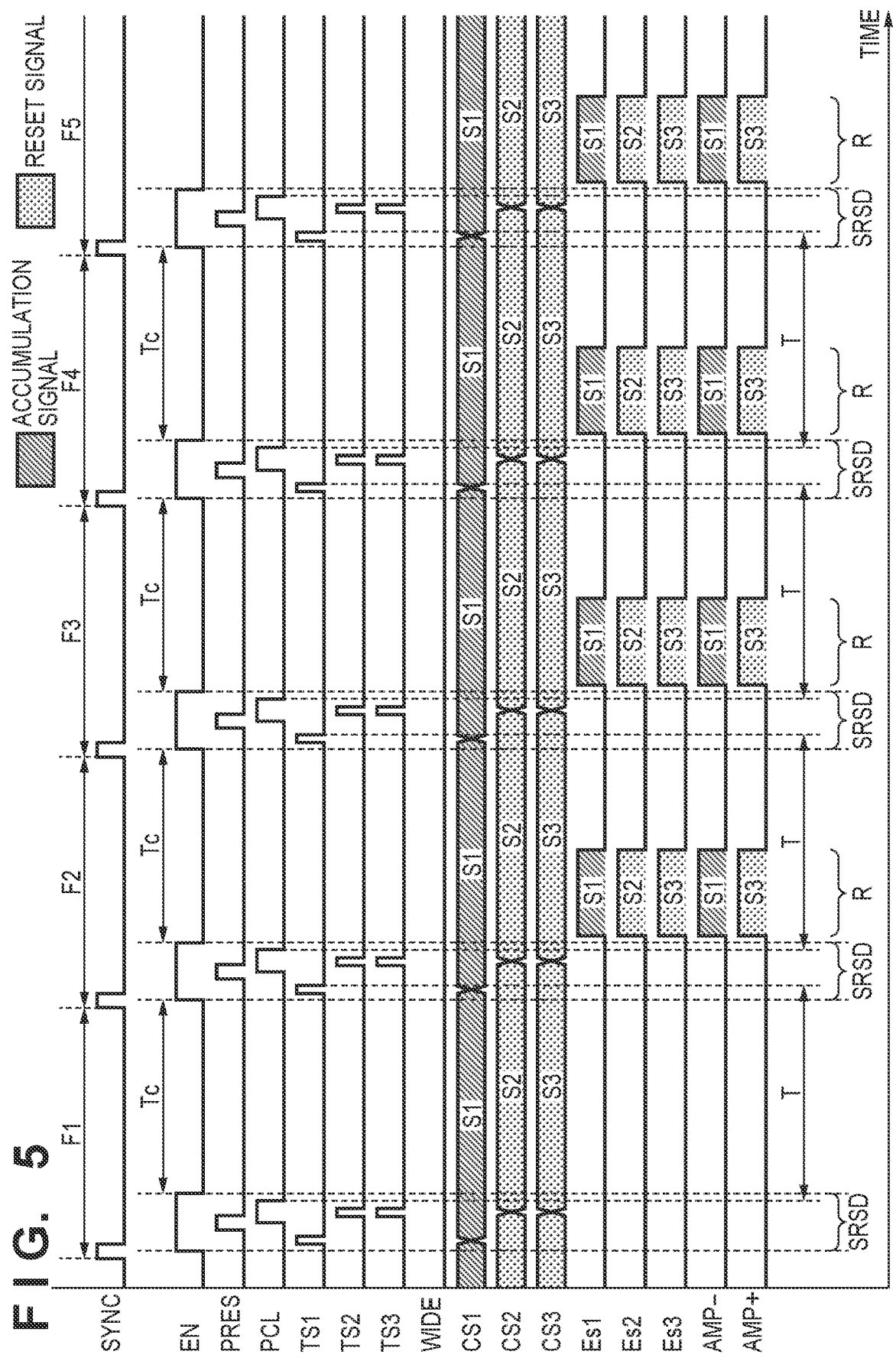
FIG. 5 is a timing chart showing a driving method for generating a radiation image using the radiation imaging apparatus in FIG. 1.

Referring to FIGS. 4 and 5, rows indicated by "SYNC" to "WIDE" indicate the levels of the respective signals. The rows indicated by "CS1", "CS2", and "CS3" indicate the signals respectively held in the capacitor elements CS1, CS2, and CS3. The rows indicated by "Es1", "Es2", and "Es3" indicate periods during which the readout unit constituted by the vertical scanning circuit 403 and the horizontal scanning circuit 404 reads out signals from the pixel arrays 120 to the signal readout unit 20. The panel control unit 109 causes the readout unit to execute a signal readout operation while "Es1" to "Es3" are at high level. The row indicated by "AMP−" indicates a period during which a signal is input to the inversion input terminal AMP− of the signal amplification unit 107. The row indicated by "AMP+" indicates a period during which a signal is input to noninversion input terminal AMP+ of the signal amplification unit 107. In addition, a period R of a readout operation indicates a period during which a signal is output from the output terminal of the signal amplification unit 107. The rows indicated by "AMP−" and "AMP+" each indicate the input period of a signal by high level.

FIG. 4 is a timing chart showing an example of the driving method of accumulating electric charge (dark electric charge) without irradiation with radiation during an accumulation period T after the resetting of the conversion unit CP and the amplification unit AP of the pixel P and nondestructively reading out the accumulated accumulation signals over a plurality of times. Each holding unit SH holds an accumulation signal corresponding to electric charge (dark electric charge) originating from the dark current generated by the conversion unit CP by one image capturing operation without irradiation with radiation. The signal processing unit 101 generates correction image data based on a plurality of accumulation signals nondestructively read out from the holding unit SH over a plurality of times while the holding unit SH is holding accumulation signals of dark electric charge. In this case, the accumulation signal held in the holding unit SH without irradiation with radiation is sometimes called a "first signal". FIG. 4 explains an example of an image capturing mode without addition of the additional capacitor Cfd'. The accumulation period T in FIG. 4 is an example of being set to the same period (length) as the accumulation period T in the moving image capturing shown in FIG. 5.

Before the driving shown in FIG. 4 is performed, the user sets the image capturing mode. More specifically, the user sets the image capturing mode with the sensitivity of the pixel P being kept high with only the FD capacitor Cfd without addition of the additional capacitor Cfd' for sensitivity switching, and the panel control unit 109 inactivates the control signal WIDE.

A frame period F is a period during which image capturing is performed in the conversion unit CP with electric charge being accumulated once. The accumulation period T indicates an accumulation period of electric charge corresponding to the frame period F. The accumulation period T is a period during which electric charge is accumulated in the photodiode PD.

Upon detecting the leading edge of a pulse of the SYNC signal, the panel control unit 109 starts driving for generating a reset image. The SYNC signal may be either an external synchronization signal or an internal synchronization signal. In this embodiment, the SYNC signal is an external synchronization signal.

Driving SRSD will be described first. The panel control unit 109 collectively performs the driving SRSD (to be described below) with respect to all the pixels P included in the image capturing panel 105. The driving SRSD includes sample/hold driving and reset driving. The sample/hold driving is driving to perform sampling/holding for holding a pixel signal in the holding unit SH. The reset driving is driving to reset the conversion unit CP and the amplification unit AP.

Upon detecting the leading edge of a pulse of the SYNC signal, the panel control unit 109 starts driving for generating an accumulation image in the frame period F.

First of all, the panel control unit 109 activates the enable signal EN. This causes the amplification transistor M4 to output the voltage obtained by amplifying a voltage from the conversion unit CP. In addition, the amplification transistor M7 outputs the voltage obtained by amplifying a voltage from the amplification transistor M4.

Subsequently, the panel control unit 109 temporarily activates the control signal TS1. With this operation, the accumulation signal S1 is transferred to the holding capacitor CS1 of the holding unit SH1 and held in the holding capacitor CS1. However, the accumulation signal S1 obtained by the first driving SRSD is not used for processing by the signal processing unit 101 and the like.

The panel control unit 109 then activates the reset signal PRES. With this operation, a reset voltage VRES as a predetermined potential is supplied to the photodiode PD, and the electric charge in the photodiode PD is reset. As a result, a voltage from the conversion unit CP at the time of resetting is input to the node n1 of the clamp capacitor Ccl. The panel control unit 109 activates the clamp signal PCL. With this operation, the clamp voltage VCL as a predetermined potential is input to the node n2 of the clamp capacitor Ccl.

The panel control unit 109 then temporarily activates the control signals TS2 and TS3 up until the clamp signal PCL is inactivated. With this operation, the reset signals S2 and S3 are transferred to the holding capacitors CS2 and CS3 of the holding units SH2 and SH3 and held in the holding capacitors CS2 and CS3 (that is, the reset signals are sampled).

The panel control unit 109 inactivates the reset signal PRES while temporarily activating the control signals TS2 and TS3. This renders the reset transistor M2 nonconductive. The panel control unit 109 inactivates the clamp signal PCL after inactivating the control signals TS2 and TS3. This renders the reset transistor M5 nonconductive to hold the potential difference, caused between the node n1 and the node n2, across the two terminals of the clamp capacitor Ccl, thus starting the accumulation period T during which electric charge is accumulated in the photoelectric conversion element PD. The panel control unit 109 inactivates the enable signal EN after inactivating the clamp signal PCL. This finishes the driving SRSD in the frame period F.

The accumulation signal S1 sampled first in the frame period F and held in the holding capacitor CS1 is unnecessary as described above. For this reason, the pixel signals (the accumulation signal S1 and the reset signals S2 and S3) are not read out. Upon detecting the leading edge of a pulse of the second SYNC signal since the start of image capturing, the panel control unit 109 performs the driving SRSD again to read out image signals accumulated and held in the accumulation period T of the frame period F.

The operation of reading out the accumulation signal S1 will be described. In this embodiment, the signal readout unit 20 starts reading out the accumulation signal S1 and the reset signal S3 after the lapse of a predetermined time since the start of holding the accumulation signal S1. At the end time of the driving SRSD after the end of the frame period F, the accumulation signal S1 corresponding to the electric charge generated by the conversion unit CP by one image capturing operation (accumulation) without irradiation with radiation during the accumulation period T of the frame period F has been held in the holding capacitor CS1 of the holding unit SH1. The accumulation signal S1 sampled by the driving SRSD after the end of the frame period F and held in the holding capacitor CS1 of the holding unit SH1 corresponds to the first signal described above. Likewise, the reset signals S2 and S3 corresponding to the clamp voltage VCL as a predetermined potential are held in the holding capacitors CS2 and CS3 of the holding units SH2 and SH3. After the lapse of a predetermined time since the end of the driving SRSD, the panel control unit 109 starts reading out the accumulation signal S1 and the reset signal S3 held in the holding unit SH1 and the holding unit SH3. More specifically, the panel control unit 109 activates the select terminal Ecs and the control signal TRO1, and inactivates the control signal TRO2. Subsequently, the panel control unit 109 selects one of the plurality of pixels P included in the pixel arrays 120 by controlling the vertical scanning circuit 403 and the horizontal scanning circuit 404. With this operation, the accumulation signal S1 held in the selected pixel P is input to the inversion input terminal AMP− of the signal amplification unit 107, and the reset signal S3 held in the selected pixel P is input to the noninversion input terminal AMP+ of the signal amplification unit 107. In this manner, the signal readout unit 20 reads out the accumulation signal S1 and the reset signal S3 at the same timing.

The panel control unit 109 reads out the accumulation signal S1 and the reset signal S3 held in the holding unit SH1 and the holding unit SH3 via signal paths (differential signal paths) for pixel signals of two systems in the pixel array 120, and outputs the signals to the signal amplification unit 107. Upon receiving the outputs from the pixel array 120, the signal amplification unit 107 outputs the signal obtained by calculating the difference between the accumulation signal S1 and the reset signal S3. The output signal from the signal amplification unit 107 corresponds to a pixel signal having undergone correction of the offset between the signal paths of the two systems using the differential input.

The A/D conversion unit 108 converts the signal output from the signal amplification unit 107 into digital data, and supplies it to the panel control unit 109. The panel control unit 109 sequentially switches selected pixels by controlling the vertical scanning circuit 403 and the horizontal scanning circuit 404 to obtain digital data for the generation of an image in the period R, and generates an accumulation image corresponding to the frame period F. The image generated in this manner based on accumulation signals read out from the respective pixels will be referred to as an accumulation image. In this case, the panel control unit 109 obtains a plurality of accumulation images by repeating nondestructive readout in the period R with respect to the accumulation signals accumulated in one image capturing operation in the accumulation period T over a plurality of times.

The processing shown in FIG. 4 is performed while the image capturing unit 150 is not irradiated with radiation, as described above. In this case, the accumulation image generated without irradiation with radiation will be referred to as a dark image. Even while the image capturing unit 150 is not irradiated with radiation, for example, the generation of a dark current in the photodiode PD causes FPN (Fixed Pattern Noise). In addition, the signal paths for pixel signals in the pixel arrays 120 include semiconductor elements such as amplification transistors, constant current sources, and switches in addition to signal lines, and the respective semiconductor elements cause different types of 1/f noise. Such 1/f noise increases with a decrease in frequency. The semiconductors of the signal amplification unit 107 and the A/D conversion unit 108 constituting the signal readout unit 20 include 1/f noise components. That is, in a generated signal, noise components originating from the signal readout unit 20 are superimposed on noise originating from the signal paths in the pixel arrays 120.

According to the above description, the accumulation signal S1 and the reset signal S3 are differentially transmitted. However, each semiconductor element in the transmission paths through which the respective signals are transmitted has a unique offset and 1/f noise. The differences in unique noise between such differential signals are superimposed on a generated image, thus appearing, in the image, as unique artifacts, random noise, vertical line noise, and block-like artifacts. Artifacts caused by unique offsets can be suppressed by correcting radiation image data captured by the image capturing unit 150 during irradiation with radiation by using the correction image data generated from a dark image obtained in advance before image capturing.

In order to properly correct 1/f noise originating from a semiconductor element that undergoes temporal variations, a dark image may be generated immediately before image capturing. Even if, however, image capturing modes are limited to several types, it takes a certain time to generate a dark image including the accumulation period T for the accumulation of electric charge. In particular, when correction image data is generated immediately before image capturing, a time lag occurs before the start of image capturing.

The influence of low-frequency noise typified by 1/f noise on an image differs depending on the location of a circuit using semiconductor elements. For example, low-frequency noise from the signal amplification transistors M10, M13, and M16 in the output unit OP of the pixel P of the pixel arrays 120 exerts, as random noise, an influence on an image. Low-frequency noise from the constant current source CCSp, the amplification transistor Av, and the constant current source CCSv, which are used to amplify pixel signals from the column signal lines 406 to 408 of the pixel array 120, exerts, as vertical line noise, an influence on an image. In addition, low-frequency noise from the amplification transistor Aout and the constant current source CCSout, used to amplify pixel signals from the analog signal lines 409 to 411, the signal amplification unit 107, and the A/D conversion unit 108 is superimposed on the entire pixel array area. The low-frequency noise originating from the amplification transistor Aout, the constant current source CCSout, the signal amplification unit 107, and the A/D conversion unit 108 exerts, as block-like artifacts, an influence on an image. It is known that, in particular, in 3D image capturing using a large-area flat panel sensor, vertical line noise and block-like artifacts generate ring artifacts on a 3D reconstructed image, resulting in exerting a larger influence on the image than random noise.

In this embodiment, an accumulation signal obtained by one image capturing operation before radiation imaging is nondestructively read out over a plurality of times, and the signal processing unit 101 generates correction image data based on the plurality of accumulation signals. More specifically, the signal processing unit 101 generates correction image data from a plurality of obtained dark images. The signal processing unit 101 then corrects the radiation image data captured by the image capturing unit 150 during irradiation with radiation by using the correction image data to generate a radiation image for each frame. This makes it possible to correct vertical line noise and block-like artifacts caused by 1/f noise while suppressing a time lag at the start of image capturing.

The manner of obtaining radiation image data captured by irradiation with radiation will be described next. FIG. 5 is a timing chart showing an example of a driving method of capturing a moving image while maximizing the accumulation period T in each frame period F. The following is a case in which in the driving method in FIG. 5, the frame rate is constant, and an image capturing mode without addition of the additional capacitor Cfd' is set.

Frame periods F1 to F5 indicate the first to fifth frame periods after the start of image capturing. A frame period is a period that is repeated to generate one radiation image. The accumulation period T indicates an accumulation period corresponding to each of the frame periods F1 to F5. An accumulation period is a period during which electric charge generated in accordance with irradiation with radiation is accumulated in the photodiode PD. In the accumulation period T, the panel control unit 109 notifies the signal processing unit 101 via the irradiation permission signal 114 that it is ready for irradiation with radiation.

An image capturing mode is set before image capturing. More specifically, because the sensitivity of the pixel P corresponds to the image capturing mode with only the FD capacitor Cfd without addition of the additional capacitor Cfd' for sensitivity switching, the control signal WIDE is inactivated by the panel control unit 109 as in the timing chart of FIG. 4. For example, after an image capturing mode is set before image capturing and the operation shown in FIG. 4 is performed to generate correction image data, the operation shown in FIG. 5 (to be described below) may be continuously performed to capture a moving image.

Upon detecting the leading edge of a pulse of a synchronization signal SYNC, the panel control unit 109 starts driving for generating a radiation image in a frame period F1. One frame period F1 starts at the leading edge of a pulse of the SYNC signal, and ends at the leading edge of the next pulse. A next frame period F2 then starts.

The driving SRSD in the frame period F1 will be described. A description redundant to that made concerning the driving with reference to FIG. 4 will be omitted. The panel control unit 109 collectively performs the driving SRSD described below with respect to all the pixels P included in the image capturing panel 105. The driving SRSD indicates sample/hold driving and reset driving that are executed in the frame periods F1 to F5. Performing the driving SRSD will hold signals in the holding capacitors CS1 to CS3 of the holding units SH1 to SH3. However, in the frame period F1, because no effective accumulation signal is held in the holding capacitor CS1, no pixel signal is read out.

Upon detecting the leading edge of a pulse of the next SYNC signal, the panel control unit 109 starts driving for generating a radiation image in the frame period F2. In the frame period F2, the panel control unit 109 performs the driving SRSD as in the frame period F1.

First of all, the panel control unit 109 activates the enable signal EN, and then temporarily activates the control signal TS1. This switches the transfer transistor M8 from the nonconductive state to the conductive state to transfer the accumulation signal S1 accumulated in the accumulation period T starting in the frame period F1 to the holding capacitor CS1 of the holding unit SH1 and hold the signal in the holding capacitor CS1 (that is, to sample the accumulation signal S1).

Subsequently, the panel control unit 109 sequentially activates the reset signal PRES and the clamp signal PCL as in the frame period F1. The panel control unit 109 then temporarily activates the control signals TS2 and TS3 to hold the reset signals S2 and S3 in the holding capacitors CS2 and CS3.

Subsequently, the panel control unit 109 sequentially inactivates the reset signal PRES and the clamp signal PCL. Inactivating the clamp signal PCL will start the accumulation period T of the frame period F2. Thereafter, the panel control unit 109 inactivates the enable signal EN and finishes the driving SRSD in the frame period F2.

The operation of reading out the accumulation signal S1 and the reset signal S3 in a period Tc of the frame period F2 will be described. In this embodiment, the signal readout unit 20 starts reading out the accumulation signal S1 and the reset signal S3 after the lapse of a predetermined time since the start of holding the accumulation signal S1. At the time of the end of the driving SRSD in the frame period F2, the accumulation signal S1 in the frame period F1 has been held in the holding capacitor CS1 of the holding unit SH1, and the reset signals S2 and S3 based on the clamp voltage VCL as a predetermined potential have been held in the holding capacitors CS2 and CS3 of the holding units SH2 and SH3. Accordingly, the panel control unit 109 starts reading out the accumulation signal S1 and the reset signal S3 held in the holding capacitor CS1 and the holding capacitor CS3 after the lapse of a predetermined time since the end of the driving SRSD. More specifically, the panel control unit 109 activates the select terminal Ecs and the control signal TRO1, and also inactivates the control signal TRO2. Subsequently, the panel control unit 109 selects one of the plurality of pixels P included in the pixel array 120 by controlling the vertical scanning circuit 403 and the horizontal scanning circuit 404. With this operation, the accumulation signal S1 held in the selected pixel P is input to the inversion input terminal AMP− of the signal amplification unit 107, and the reset signal S3 held in the selected pixel P is input to the noninversion input terminal AMP+ of the signal amplification unit 107. In this manner, the signal readout unit 20 reads out the accumulation signal S1 and the reset signal S3 at the same timing.

The panel control unit 109 reads out the held accumulation signal S1 and the held reset signal S3 via signal paths (differential signal paths) for pixel signals of the two systems in the pixel array 120, and outputs the signals to the signal amplification unit 107. Upon receiving the outputs from the pixel array 120, the signal amplification unit 107 outputs the signal obtained by calculating the difference between the accumulation signal S1 and the reset signal S3. The output signal from the signal amplification unit 107 corresponds to a pixel signal having undergone correction of the offset between the signal paths of the two systems using the differential input. However, the noise difference included in the signal paths of the two systems remains in this signal.

The A/D conversion unit 108 converts the signal output from the signal amplification unit 107 into digital data, and supplies it to the panel control unit 109. The panel control unit 109 sequentially switches selected pixels by controlling the vertical scanning circuit 403 and the horizontal scanning circuit 404 to obtain radiation image data for the generation of an image in the period R and generate an accumulation image corresponding to the frame period F1.

Subsequently, the panel control unit 109 performs the driving SRSD in the same manner as described above in frame periods after the frame period F3. With the driving SRSD, the accumulation signal S1 and the reset signals S2 and S3 in an immediately preceding frame period are respectively transferred to the holding capacitor CS1 and the holding capacitors CS2 and CS3 and held in the respective holding capacitors. Upon finishing the driving SRSD, the panel control unit 109 sequentially switches the pixel P to be selected to obtain radiation image data for the generation of an image in the period R and generate an accumulation image corresponding to the immediately preceding frame period.

Figure 6:
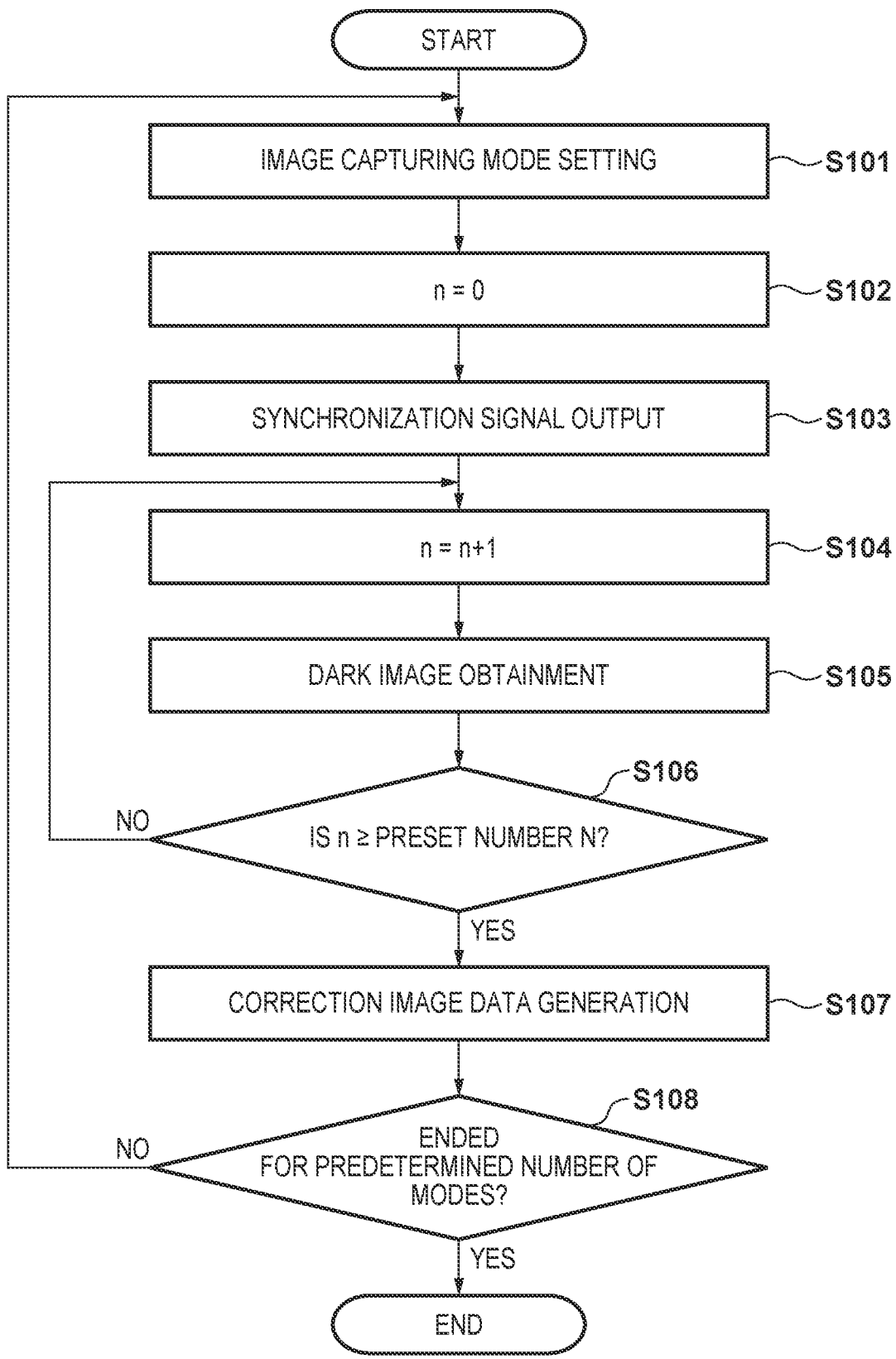
FIG. 6 is a flowchart showing the driving method for generating correction image data using the radiation imaging apparatus in FIG. 1.
Figure 7:
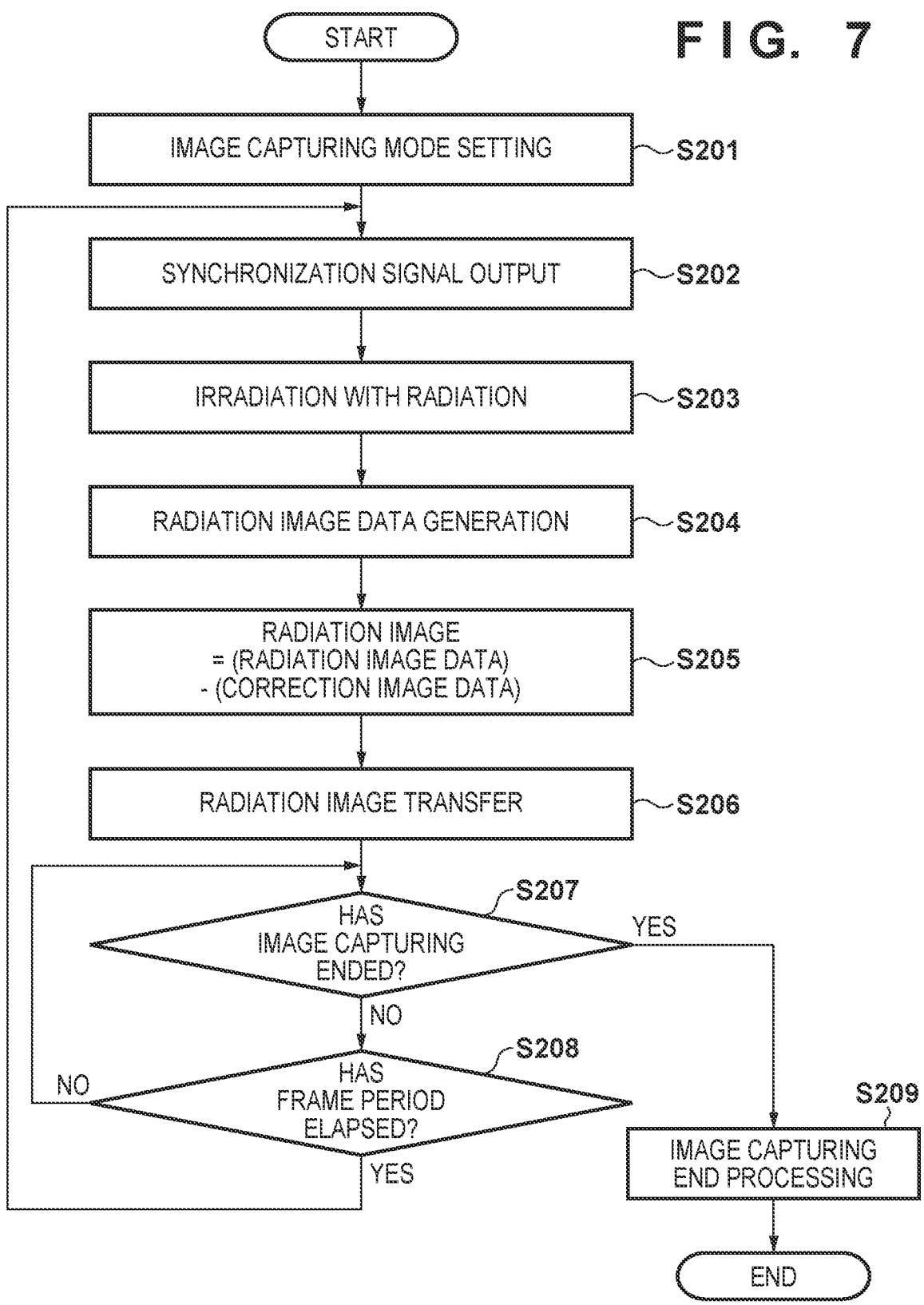
FIG. 7 is a flowchart showing the driving method for generating a radiation image using the radiation imaging apparatus in FIG. 1.

Methods of generating correction image data and a radiation image will be described next with reference to FIGS. 6 and 7. An operation for generating correction image data without irradiation with radiation will be described first with reference to FIG. 6. The operation shown in FIG. 6 is executed before the start of image capturing with irradiation with radiation, as described above.

In step S101, the signal processing unit 101 issues a control command to the panel control unit 109 of the image capturing unit 150 via the control interface 110, and sets an image capturing mode. In step S102, the signal processing unit 101 resets an image capturing counter n in the signal processing unit 101 to 0, and starts the processing of generating an accumulation image as a source of correction image data.

In step S103, the signal processing unit 101 outputs the synchronization signal pulse SYNC to the panel control unit 109 via the synchronization signal 113. Because correction image data is generated based on a dark image as described above, the radiation generation apparatus 104 does not perform irradiation with radiation. Upon outputting the synchronization signal pulse SYNC, the signal processing unit 101 increments the image capturing counter n in step S104.

Upon receiving the synchronization signal pulse SYNC via the synchronization signal 113 in step S105, the panel control unit 109 drives the image capturing panel 105 and the signal readout unit 20 in accordance with the timing chart shown in FIG. 4. The panel control unit 109 A/D-converts the difference between the accumulation signal S1 and the reset signal S3 held in each pixel P, and transfers the resultant data as pixel data to the signal processing unit 101 via the image data interface 111. The signal processing unit 101 generates an accumulation image (dark image) based on the transferred pixel data. The signal processing unit 101 stores the nth dark image in a storage unit 115 of the radiation imaging apparatus 100 shown in FIG. 3. FIG. 3 shows the signal processing unit 101 and the storage unit 115 as discrete components. However, the signal processing unit 101 may integrate the storage unit 115.

In step S106, the signal processing unit 101 determines whether the number of dark images obtained has reached a preset number N set in the image capturing mode. If the preset number N of dark images have been able to be obtained (YES in step S106), the signal processing unit 101 advances the process to step S107. If the preset number N of dark images have not been able to be obtained (NO in step S106), the signal processing unit 101 returns the process to step S104.

If the preset number N of dark images have been obtained, the signal processing unit 101 generates one image by averaging the N dark images in step S107, and stores the image as correction image data in the storage unit 115.

In step S108, the signal processing unit 101 determines whether correction image data has been obtained by the types of image capturing modes used for image capturing by the radiation imaging system SYS. If correction image data has not been obtained by the required types (NO in step S108), the signal processing unit 101 returns the process to step S101 to generate correction image data by the required types. If correction image data has been obtained by the required types (YES in step S108), the signal processing unit 101 terminates the processing for generating correction image data.

An operation for generating a radiation image captured by irradiation with radiation will be described next with reference to FIG. 7. The operation shown in FIG. 7 can be performed after the operation for obtaining correction image data shown in FIG. 6. The following is a case in which a moving image is captured in the same manner as in FIG. 5.

First of all, in step S201, the signal processing unit 101 issues a control command to the panel control unit 109 to set an image capturing mode. In step S202, the signal processing unit 101 then outputs the synchronization signal pulse SYNC to the panel control unit 109. Upon receiving the synchronization signal pulse SYNC, the panel control unit 109 starts driving the image capturing panel 105 in accordance with the timing chart shown in FIG. 5, and keeps outputting the irradiation permission signal 114 to the signal processing unit 101 during the accumulation period T set in step S201.

In step S203, the signal processing unit 101 outputs a control signal to the irradiation control unit 103 so as to perform irradiation with radiation in accordance with the duration of the accumulation period T. The irradiation control unit 103 controls the radiation generation apparatus 104 in accordance with this control signal.

In step S204, the panel control unit 109 A/D-converts the difference between the accumulation signal S1 and the reset signal S3 held in each pixel P, and transfers the resultant data as pixel data to the signal processing unit 101 via the image data interface 111. The signal processing unit 101 generates radiation image data based on sequentially transferred pixel data.

In step S205, the signal processing unit 101 generates a radiation image for each frame period by subtracting the correction image data stored in the storage unit 115 in step S107 from the radiation image data. In this processing, the signal processing unit 101 performs correction by using correction image data, of the plurality of correction image data stored in the storage unit 115, which corresponds to the image capturing mode in which the radiation image data has been captured. More specifically, the signal processing unit 101 selects correction image data corresponding to the same image capturing mode as that used to capture a radiation image, including a resolution and an accumulation period.

In step S206, the signal processing unit 101 transfers a radiation image for each frame period to the subsequent step in accordance with the image capturing mode. In the subsequent step, the signal processing unit 101 may perform image processing such as gain correction processing and sharpening processing with respect to the transferred radiation image in a pipeline scheme concurrently with radiation image capturing. When performing image capturing for the observation of a radiation image in real time, such as radioscopic imaging, the signal processing unit 101 transfers a processed radiation image to the display unit 102 to display the image. When performing image capturing based on a plurality of radiation images, such as 3D image capturing, the signal processing unit 101 may temporarily store processed radiation images in the storage unit 115, perform image processing after the end of image capturing of all radiation images, and displays the resultant images on the display unit 102.

In step S207, the signal processing unit 101 determines whether to finish the image capturing, based on an exposure switch (not shown) operated by the user, the preset number of images to be captured which is programmed upon setting of an image capturing mode, or the like. When continuing the image capturing (NO in step S207), the signal processing unit 101 determines the elapsed time of the frame period F in step S208. Upon determining that the image capturing has finished (YES in step S207), the signal processing unit 101 transmits a control command informing the end of generation of radiation images in the current image capturing mode to the panel control unit 109 via the control interface 110 in step S209. In response to this control command, the panel control unit 109 finishes the radiation image capturing.

In step S208, the signal processing unit 101 determines whether the frame period F has elapsed. Upon determining that the frame period F has not elapsed (NO in step S208), the signal processing unit 101 returns the process to step S207. Upon determining that the frame period has elapsed (YES in step S208), the signal processing unit 101 returns the process to step S202 to capture a next radiation image.

As described above, in this embodiment, each holding unit SH holds an accumulation signal corresponding to electric charge converted by the conversion unit CP by one image capturing operation (accumulation) without irradiation with radiation. In addition, the signal processing unit 101 generates correction image data based on a plurality of accumulation signals S1 nondestructively read out from the holding unit SH while the holding unit SH holds the accumulation signal S1. The signal processing unit 101 performs image capturing only once accompanying the accumulation period T and reads out the accumulation signal S1 a plurality of times. This makes it possible to obtain correction image data in a short time as compared with a case of repeating image capturing and readout of an accumulation signal.

This embodiment has exemplified the case in which the accumulation signal S1 and the reset signal S3 are obtained by one image capturing operation and differentially amplified. However, the above control operation for generating correction image data can also be applied to an image capturing apparatus that obtains only the accumulation signal S1. In the above configuration, each holding unit SH includes the three holding capacitors CS1 to CS3 (holding units SH1 to SH3). However, because the above operation is configured to obtain only one accumulation signal and one reset signal, the holding unit SH may be configured to include only the two holding capacitors CS1 and CS2 (holding units SH1 and SH2). In this case, the output unit OP can also be configured to include the output units OP1 and OP2. In addition, the embodiment has exemplified the case in which a moving image is captured by image capturing with irradiation with radiation. However, image capturing may be performed to capture a still image.

A control method (driving method) for a radiation imaging apparatus according to the second embodiment of the present invention will be described with reference to FIGS. 8 to 11. The configurations of a radiation imaging apparatus 100 and a radiation imaging system SYS may be the same as those of the first embodiment, and hence a description of the configurations will be omitted. The differences between the first embodiment and the second embodiment will be mainly described.

Figure 8:
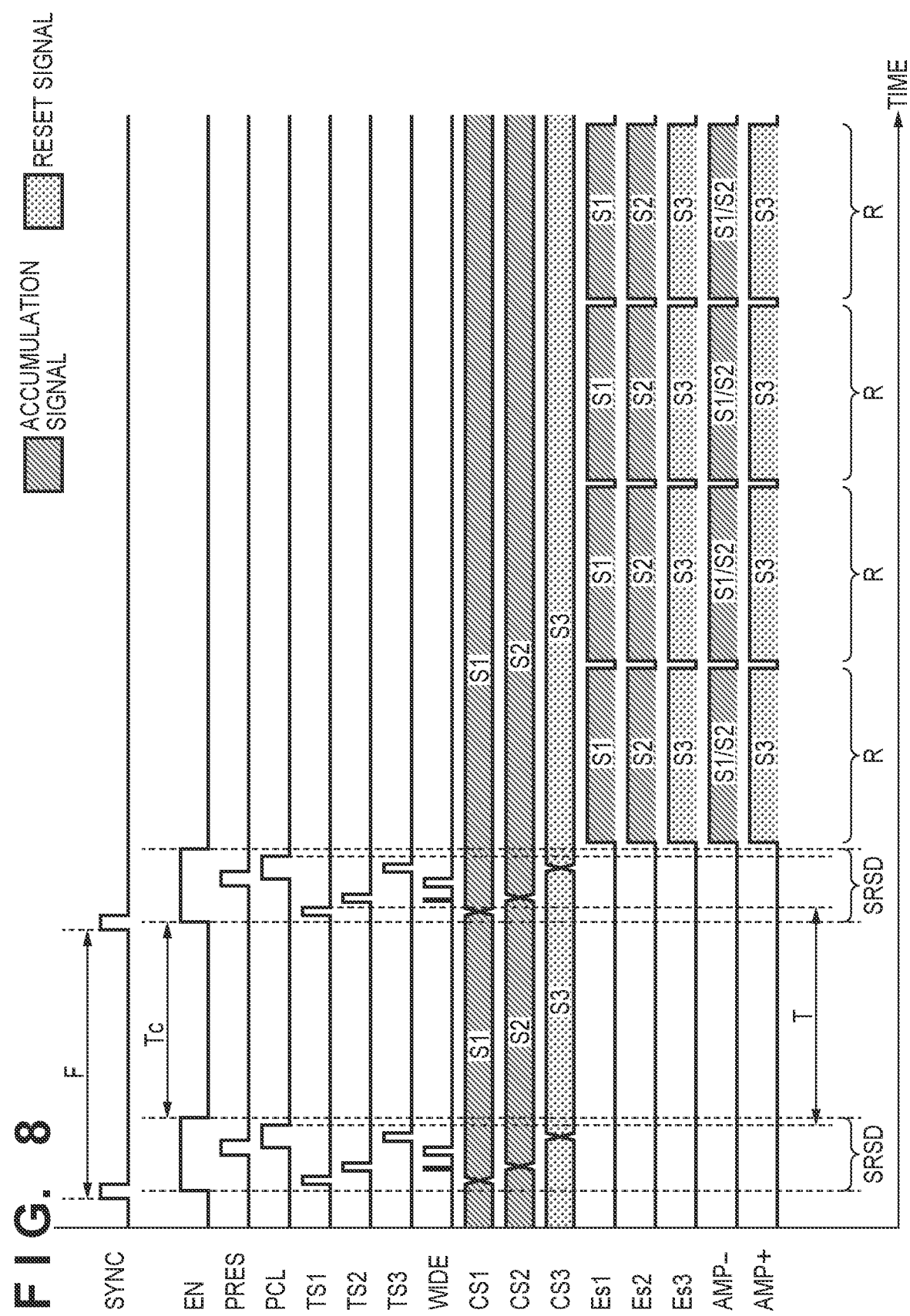
FIG. 8 is a timing chart showing a driving method for generating correction image data using the radiation imaging apparatus in FIG. 1.
Figure 9:
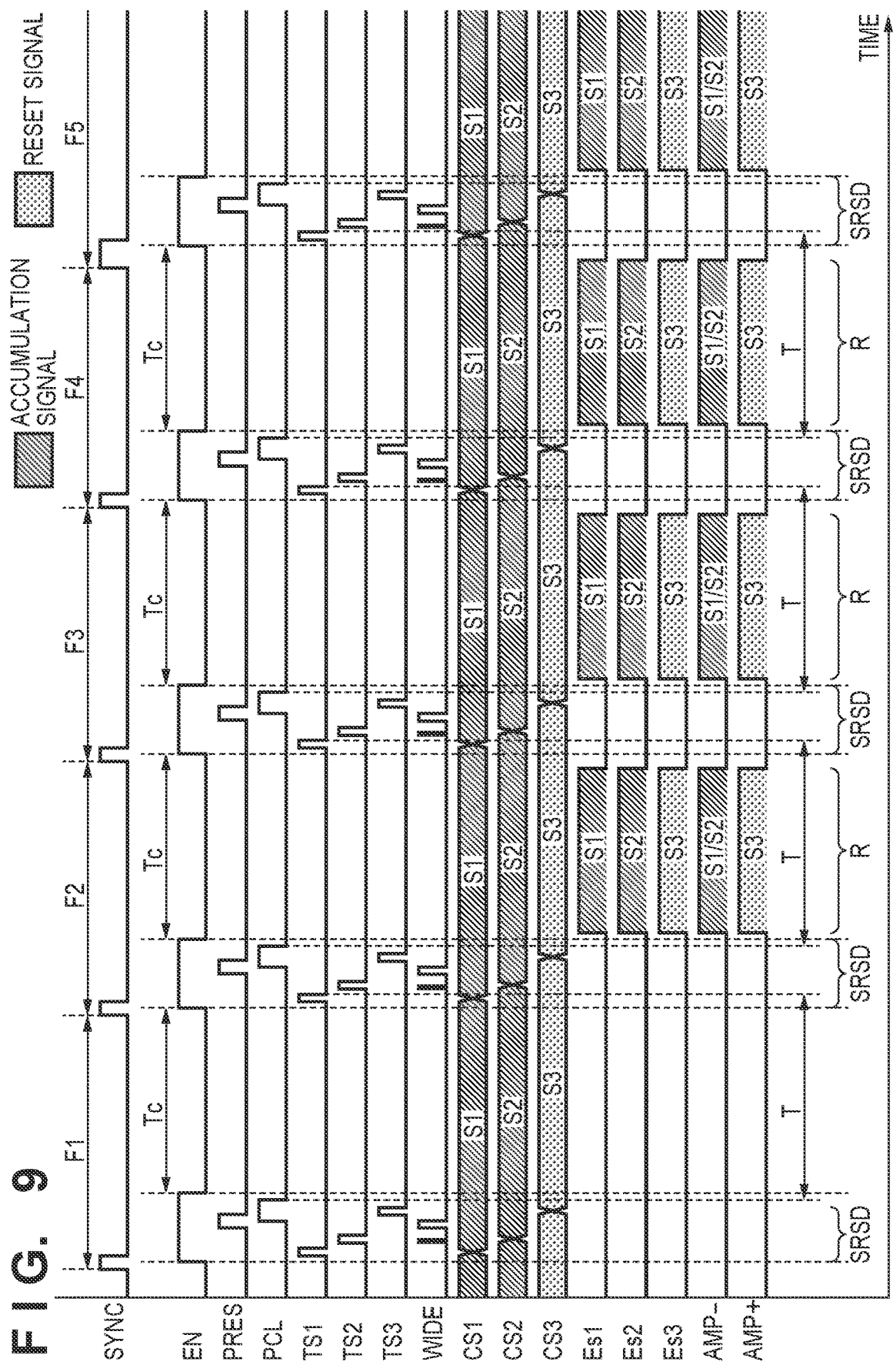
FIG. 9 is a timing chart showing a driving method for generating a radiation image using the radiation imaging apparatus in FIG. 1.

This embodiment will exemplify a case in which the image capturing mode of reading out signals with two types of sensitivities is set. For example, radiation images of two types of sensitivities generated from readout signals can be used as radiation images to be combined to extend the dynamic range. FIGS. 8 and 9 are timing charts for the operation of reading out signals with two types of sensitivities. An image capturing unit 150 generates a plurality of accumulation images (dark images) for the generation of correction image data without irradiation with radiation by using the driving method shown in FIG. 8. According to the driving method shown in FIG. 9, the image capturing unit 150 also captures a moving image constituted by radiation images captured in a plurality of frames during irradiation with radiation.

Referring to FIG. 8, after a conversion unit CP and an amplification unit AP of a pixel P are reset, electric charge (dark electric charge) is accumulated during an accumulation period T without irradiation with radiation. FIG. 8 is a timing chart showing an example of a driving method when accumulation signals are sampled in a holding unit SH with two types of sensitivities, and the accumulation signals held in the holding unit SH are nondestructively read out over a plurality of times.

Driving SRSD in a frame period F will be described first. An image capturing mode is set before the start of image capturing. Upon detecting the leading edge of a pulse of the SYNC signal, a panel control unit 109 starts driving for generating a frame image in the frame period F. First of all, the panel control unit 109 activates an enable signal EN.

The panel control unit 109 then temporarily activates a control signal TS1 while keeping a control signal WIDE for sensitivity switching inactive. With this operation, a signal (high-sensitivity signal) corresponding to the voltage generated in a FD capacitor Cfd is transferred as an accumulation signal S1 to a holding capacitor CS1 of a holding unit SH1 and held in the holding capacitor CS1. The panel control unit 109 then activates the control signal WIDE for sensitivity switching and a control signal TS2. Activating the WIDE signal will render a transistor M1 conductive. Accordingly, the capacitor of a conversion unit CP becomes the combined capacitor of the FD capacitor Cfd and a capacitor Cfd'. As a result, the output of the conversion unit CP becomes the voltage generated in the combined capacitor of the FD capacitor Cfd and the capacitor Cfd' by the electric charge generated in a photodiode PD. The panel control unit 109 then inactivates the control signal WIDE for sensitivity switching. The transistor M1 is rendered nonconductive, and the capacitor of the conversion unit CP becomes the FD capacitor Cfd. However, the output of the conversion unit CP is maintained. The panel control unit 109 then inactivates a control signal TS2. With this operation, a signal (low-sensitivity signal) corresponding to the voltage generated in the combined capacitor of the FD capacitor Cfd and the capacitor Cfd' by the electric charge generated by the photodiode PD is transferred as an accumulation signal S2 to the holding capacitor CS2 of the holding unit SH2 and held in the holding capacitor CS2. In this case, the accumulation signal S1 and the accumulation signal S2 obtained by the first driving SRSD in image capturing are signals that are not used to generate an image as in the first embodiment.

Subsequently, the panel control unit 109 activates a reset signal PRES and inactivates the control signal WIDE. With this operation, the reset voltage VRES as a predetermined potential is supplied to the photodiode PD, and the electric charge of the photodiode PD, the FD capacitor Cfd, and the additional capacitor Cfd' are reset. As a result, a voltage from the conversion unit CP at the time of resetting is input to a node n1 of a clamp capacitor Ccl. The panel control unit 109 then inactivates the control signal WIDE for sensitivity switching. The transistor M1 is rendered nonconductive, and the capacitor of the conversion unit CP becomes the FD capacitor Cfd.

The panel control unit 109 then activates a clamp signal PCL. With this operation, a clamp voltage VCL as a predetermined potential is input to a node n2 of the clamp capacitor Ccl. After the clamp voltage VCL is input to the node n2, the panel control unit 109 inactivates the reset signal PRES. This renders the reset transistor M2 nonconductive. The panel control unit 109 then temporarily activates a control signal TS3 up until inactivating the clamp signal PCL. With this operation, a reset signal S3 is transferred to a holding capacitor CS3 of a holding unit SH3 and held in the holding capacitor CS3.

The panel control unit 109 inactivates the clamp signal PCL after inactivating the control signal TS3. With this operation, a reset transistor M5 is rendered nonconductive, and the potential difference caused between the node n1 and the node n2 is held across the two terminals of the clamp capacitor Ccl to start an accumulation period T during which electric charge is accumulated in the photoelectric conversion element PD without irradiation with radiation. Upon inactivating the clamp signal PCL, the panel control unit 109 inactivates the enable signal EN. This finishes the driving SRSD in the frame period F. In the period F, because no effective accumulation signal is held in the holding capacitor CS1 and the holding capacitor CS2, no pixel signal is read out.

Upon detecting the leading edge of the next pulse of the SYNC signal, the panel control unit 109 performs the driving SRSD as in the frame period F for the generation of an accumulation image. With this driving SRSD, a signal corresponding to the voltage of FD capacitor Cfd corresponding to the electric charge generated in the photodiode PD in the accumulation period T of the frame period F is transferred as the accumulation signal S1 to the holding capacitor CS1 of the holding unit SH1 and held in the holding capacitor CS1. The panel control unit 109 then activates the WIDE signal to render the transistor M1 conductive. As a result, a signal corresponding to the voltage of the combined capacitor of the FD capacitor Cfd and the capacitor Cfd' which corresponds to the electric charge generated in the photodiode PD is transferred as the accumulation signal S2 to the holding capacitor CS2 and held in the holding capacitor CS2. In addition, a reset signal corresponding to the electric charge of the amplification unit AP when a reset unit RP resets the conversion unit CP and the amplification unit AP is transferred as the reset signal S3 to the holding capacitor CS3 of the holding unit SH3 and held in the holding capacitor CS3. The accumulation signal S1 sampled by the driving SRSD performed after the end of the frame period F and held in the holding capacitor CS1 of the holding unit SH1 corresponds to the first signal. In addition, the accumulation signal S2 held in the holding capacitor CS2 of the holding unit SH2 is sometimes called the "second signal".

The operation of reading out the accumulation signal S1 and the accumulation signal S2 corresponding to the electric charge (dark electric charge) accumulated in the accumulation period T of the frame period F without irradiation with radiation will be described next. A signal readout unit 20 starts reading out the accumulation signal S1, the accumulation signal S2, and the reset signal S3 after the lapse of a predetermined time since the completion of holding of the signals. More specifically, first of all, the panel control unit 109 activates a select terminal Ecs. The panel control unit 109 then activates a control signal TRO1 and inactivates a control signal TRO2. With this operation, the accumulation signal S1 is selected. Subsequently, the panel control unit 109 controls a vertical scanning circuit 403 and a horizontal scanning circuit 404 to select a pixel, of a plurality of pixels P included in a pixel array 120, from which a signal is to be read out first. With this operation, the accumulation signal S1 of the first pixel P is input to an inversion input terminal AMP− of a signal amplification unit 107, and the reset signal S3 is input to a noninversion input terminal AMP+ of the signal amplification unit 107. In this manner, the signal readout unit 20 reads out the difference between the accumulation signal S1 and the reset signal S3 at the same timing.

The panel control unit 109 sequentially switches the pixel P to be selected by controlling the horizontal scanning circuit 404, and reads out one-row pixel data as the difference between the accumulation signal S1 and the reset signal S3. The panel control unit 109 then inactivates the control signal TRO1 and activates the control signal TRO2. With this operation, the accumulation signal S2 is selected. The panel control unit 109 sequentially switches the pixel P to be selected by controlling the horizontal scanning circuit 404, and reads out one-row pixel data as the difference between the accumulation signal S2 and the reset signal S3. That is, the panel control unit 109 scans one row twice to read out the difference between the accumulation signal S1 and the reset signal S3 by the first scanning operation and read out the difference between the accumulation signal S2 and the reset signal S3 by the second scanning operation.

The panel control unit 109 generates pixel data for the generation of two types of images in a readout period R by switching the control signal TRO1 and the control signal TRO2 for each scanning operation while controlling the vertical scanning circuit 403 and the horizontal scanning circuit 404. The panel control unit 109 generates a high-sensitivity accumulation image based on the accumulation signal S1 held in the holding capacitor CS1 and a low-sensitivity accumulation image based on the accumulation signal S2 held in the holding capacitor CS2. The panel control unit 109 performs nondestructive readout in the period R with respect to the accumulation signal accumulated once in the accumulation period T over a plurality of times. This obtains a plurality of high-sensitivity accumulation images and a plurality of low-sensitivity accumulation images for the generation of correction image data. The signal processing unit 101 generates correction image data used in an image capturing mode of performing high-sensitivity image capturing and correction image data used in an image capturing mode of performing low-sensitivity image capturing by using the plurality of high-sensitivity accumulation images and the plurality of low-sensitivity accumulation images.

The manner of obtaining a radiation image by image capturing by irradiation with radiation will be described next. FIG. 9 is a timing chart showing an example of a driving method for capturing a moving image while maximizing the accumulation period T in each frame period F. The following is a case in which the driving method shown in FIG. 9 is performed by using an image capturing mode in which the frame rate is constant, and image capturing is performed with two types of sensitivities, including image capturing with high sensitivity without the additional capacitor Cfd' and image capturing with low sensitivity with the additional capacitor Cfd'.

Frame periods F1 to F5 indicate the first to fifth frame periods since the start of image capturing. The driving SRSD in the frame period F1 will be described first. Upon detecting the leading edge of a pulse of the SYNC signal after an image capturing mode is set, the panel control unit 109 starts driving for the generation of a frame image in the frame period F1. In the frame period F1, the driving SRSD is performed in the same manner as in the frame period F described with reference to FIG. 8.

When the control signal TS1 is temporarily activated in the driving SRSD, a signal corresponding to the voltage generated in the FD capacitor Cfd is transferred as the accumulation signal S1 to the holding capacitor CS1 of the holding unit SH1 and held in the holding capacitor CS1. When the control signal TS2 is then temporarily activated, a signal corresponding to the voltage of the combined capacitor of the FD capacitor Cfd and the capacitor Cfd' is transferred as the accumulation signal S2 to the holding capacitor CS2 of the holding unit SH2 and held in the holding capacitor CS2. In addition, when the control signal TS3 is temporarily activated, a reset signal corresponding to the electric charge of the amplification unit AP when the reset unit RP resets the conversion unit CP and the amplification unit AP is transferred to the holding capacitor CS3 of the holding unit SH3 and held in the holding capacitor CS3. In this case, the accumulation signal S1 and the accumulation signal S2 obtained by the first driving SRSD in image capturing are signals that are not used for the generation of a radiation image as in the above case.

Upon detecting the leading edge of a pulse of the next SYNC signal, the panel control unit 109 starts driving for the generation of a frame image in the frame period F2. In the frame period F2, the driving SRSD is performed in the same manner as in the frame period F1.

Performing the driving SRSD in the frame period F2 will transfer, to the holding capacitor CS1, a signal (high-sensitivity signal) as the accumulation signal S1 which corresponds to the voltage generated in the FD capacitor Cfd which is generated by the electric charge generated in the photodiode PD by irradiation with radiation in the frame period F1, and hold the signal in the holding capacitor CS1. Subsequently, when the WIDE signal is activated, the transistor M1 is rendered conductive. With this operation, a signal (low-sensitivity signal) corresponding to the voltage generated in the combined capacitor of the FD capacitor Cfd and the capacitor Cfd' which is generated by the electric charge generated in the accumulation period T of the frame period F1 is transferred as the accumulation signal S2 to the holding capacitor CS2 and held in the holding capacitor CS2. In addition, a reset signal corresponding to the electric charge of the amplification unit AP when the reset unit RP resets the conversion unit CP and the amplification unit AP is transferred as the reset signal S3 to the holding capacitor CS3 and held in the holding capacitor CS3. The panel control unit 109 then starts the accumulation period T in the frame period F2.

The operation of reading out the accumulation signal S1, the accumulation signal S2, and the reset signal S3 in a period Tc of the frame period F2 will be described next. The signal readout unit 20 starts reading out the accumulation signal S1, the accumulation signal S2, and the reset signal S3 after the lapse of a predetermined time since the completion of holding of the accumulation signal S1, the accumulation signal S2, and the reset signal S3. More specifically, first of all, the panel control unit 109 activates the select terminal Ecs. The panel control unit 109 then activates the control signal TRO1 and inactivates the control signal TRO2. With this operation, the accumulation signal S1 is selected. Subsequently, the panel control unit 109 controls the vertical scanning circuit 403 and the horizontal scanning circuit 404 to select the pixel P, of the plurality of pixels P included in the pixel array 120, from which a signal is to be read out first. With this operation, the accumulation signal S1 from the pixel P selected first is input to the inversion input terminal AMP− of the signal amplification unit 107, and the reset signal S3 from the same pixel P is input to the noninversion input terminal AMP+ of the signal amplification unit 107. In this manner, the signal readout unit 20 reads out the difference between the accumulation signal S1 and the reset signal S3 at the same timing.

The panel control unit 109 sequentially switches the pixel P to be selected by controlling the horizontal scanning circuit 404, and reads out one-row pixel data as the difference between the accumulation signal S1 and the reset signal S3. The panel control unit 109 then inactivates the control signal TRO1 and activates the control signal TRO2. With this operation, the accumulation signal S2 is selected. The panel control unit 109 sequentially switches the pixel P to be selected by controlling the horizontal scanning circuit 404, and reads out one-row pixel data as the difference between the accumulation signal S2 and the reset signal S3. That is, the panel control unit 109 scans one row twice, and reads out the difference between the accumulation signal S1 and the reset signal S3 in the first scanning operation and the difference between the accumulation signal S2 and the reset signal S3 in the second scanning operation.

The panel control unit 109 obtains pixel data for the generation of images with two types of sensitivities in the readout period R by switching the control signal TRO1 and the control signal TRO2 for each scanning operation while controlling the vertical scanning circuit 403 and the horizontal scanning circuit 404. The panel control unit 109 generates a high-sensitivity accumulation image (radiation image) based on the accumulation signal S1 held in the holding capacitor CS1 and a low-sensitivity accumulation image (radiation image) based on the accumulation signal S2 held in the holding capacitor CS2.

Subsequently, the panel control unit 109 performs similar driving SRSD in the frame periods F after the frame period F3. An accumulation signal in the immediately preceding frame period F is held by the driving SRSD. Upon completion of the driving SRSD, the panel control unit 109 generates an accumulation image corresponding to the immediately preceding frame period F.

Figure 10:
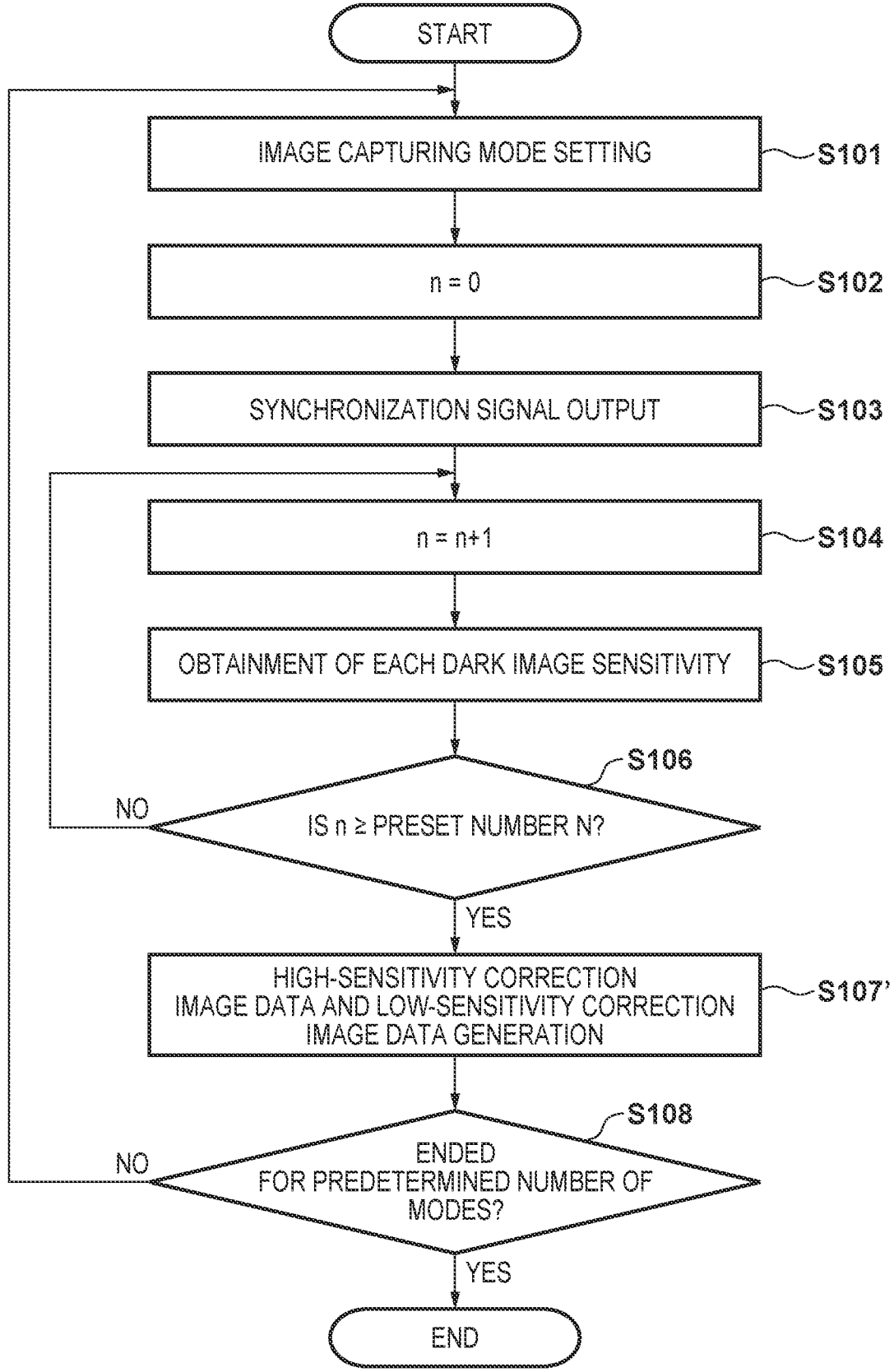
FIG. 10 is a flowchart showing the driving method for generating correction image data using the radiation imaging apparatus in FIG. 1.

Methods of generating correction image data and a radiation image will be described next with reference to FIGS. 10 and 11. FIG. 10 explains an operation for generating correction image data without irradiation with radiation. The operation in FIG. 10 is executed before the start of image capturing with irradiation with radiation, as described above.

The processing in steps S101 to S104 in FIG. 10 is the same as that in the first embodiment described above. In step S105', the panel control unit 109 drives the image capturing panel 105 and the signal readout unit 20 in accordance with the timing chart of FIG. 8 upon receiving a synchronization signal pulse SYNC via a synchronization signal 113. The panel control unit 109 A/D-converts the differences between the accumulation signals S1 and S2 of the two types of sensitivities and the reset signal S3 held in each pixel P, and transfers the resultant data as pixel data to a signal processing unit 101 via an image data interface 111. The signal processing unit 101 generates accumulation images (dark images) based on the transferred pixel data of the two types of sensitivities. The signal processing unit 101 causes a storage unit 115 to store the nth dark images of the two types of sensitivities including high sensitivity and low sensitivity.

In step S106, the signal processing unit 101 determines whether the number of dark images obtained has reached a preset number N set in the image capturing mode. If the preset number N of dark images have been able to be obtained (YES in step S106), the signal processing unit 101 advances the process to step S107. If the preset number N of dark images have not been able to be obtained (NO in step S106), the signal processing unit 101 returns the process to step S104.

If the preset number N of dark images have been obtained, the signal processing unit 101 generates, in step S107', one high-sensitivity image and one low-sensitivity image by respectively averaging the N high-sensitivity dark images and the N low-sensitivity dark images. The signal processing unit 101 stores these images in the storage unit 115 as high-sensitivity correction image data and low-sensitivity correction image data.

In step S108, the signal processing unit 101 determines whether correction image data has been obtained by the types of image capturing modes used for image capturing by a radiation imaging system SYS. If correction image data has not been obtained by the required types (NO in step S108), the signal processing unit 101 returns the process to step S101 to generate correction image data by the required types. If correction image data has been obtained by the required types (YES in step S108), the signal processing unit 101 terminates the processing for generating correction image data.

An operation for generating a radiation image captured by irradiation with radiation will be described next with reference to FIG. 11. The operation shown in FIG. 11 can be performed after the operation for obtaining correction image data shown in FIG. 10.

Figure 11:
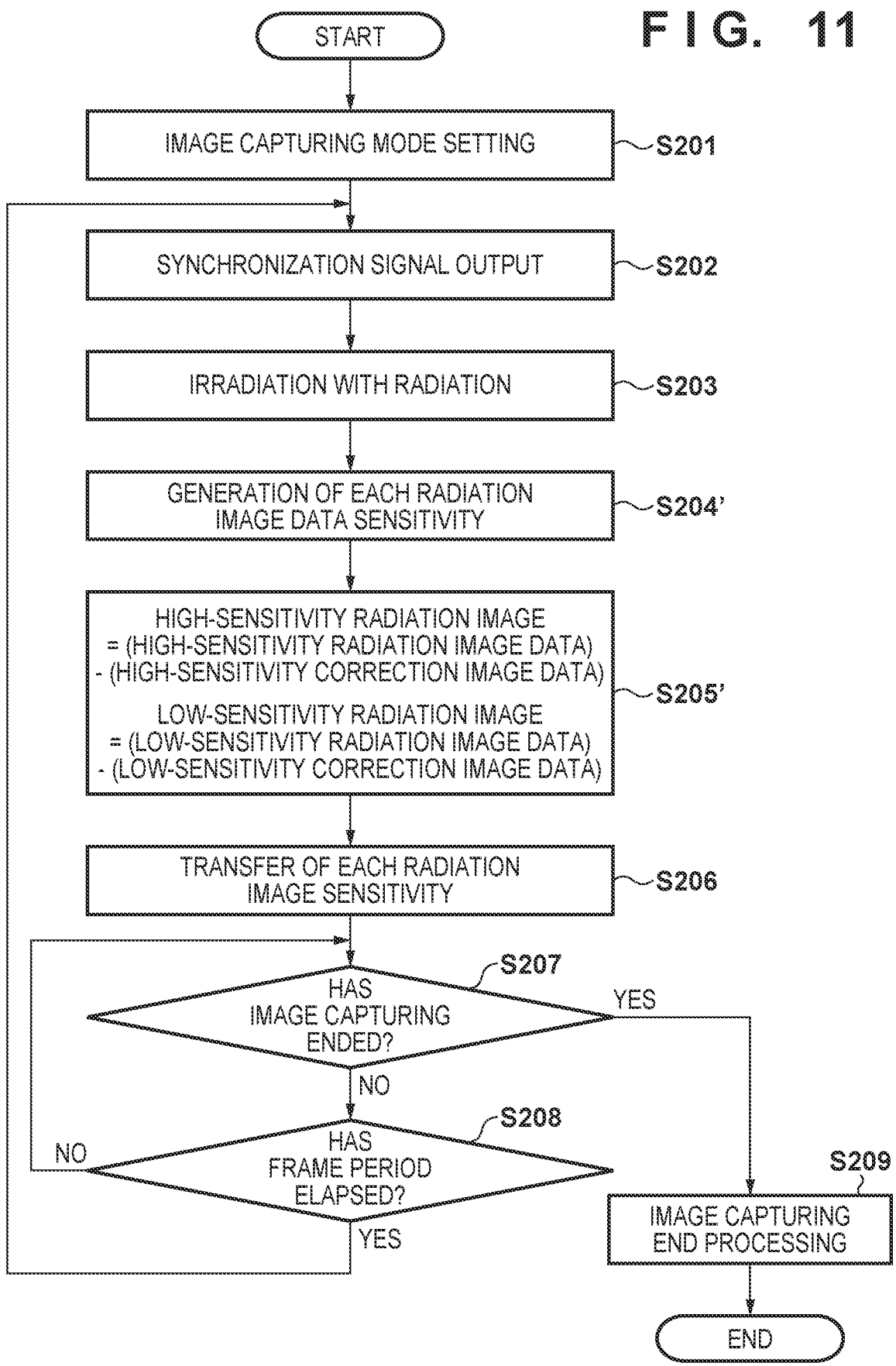
FIG. 11 is a flowchart showing the driving method for generating a radiation image using the radiation imaging apparatus in FIG. 1.

The processing in steps S201 to S203 in FIG. 11 is the same as that in the first embodiment described above. In step S204', the panel control unit 109 A/D-converts the differences between the reset signal and the accumulation signals S1 and S2 of the two types of sensitivities held in each pixel P, and transfers the resultant data as pixel data to the signal processing unit 101 via the image data interface 111. The signal processing unit 101 generates high-sensitivity radiation image data and low-sensitivity radiation image data based on the sequentially transferred pixel data of the two types of sensitivities including high sensitivity and low sensitivity.

In step S205', the signal processing unit 101 subtracts the high-sensitivity and low-sensitivity correction image data stored in the storage unit 115 in step S107' from the high-sensitivity and low-sensitivity radiation image data. This generates radiation images with two types of sensitivities including high sensitivity and low sensitivity. In this processing, the signal processing unit 101 corrects radiation image data by using correction image data, of the plurality of correction image data stored in the storage unit 115, which corresponds to the image capturing mode used to capture the radiation image data.

In step S206', the signal processing unit 101 transfers the high-sensitivity and low-sensitivity radiation images to the subsequent step in accordance with the image capturing mode. In the subsequent step, the signal processing unit 101 performs image processing such as gain correction processing and sharpening processing with respect to the transferred radiation images of the two types of sensitivities in a pipeline scheme concurrently with radiation image capturing. When performing image capturing for the observation of an image in real time, such as fluoroscopic imaging, the signal processing unit 101 transfers a processed radiation image to the display unit 102 to display the image. When performing image capturing based on a plurality of radiation images, such as 3D image capturing, the signal processing unit 101 can temporarily store frame images having undergone image processing in the storage unit 115. The processing in steps S207 to S209 in FIG. 11 is the same as that in the first embodiment.

As described above, in this embodiment as well, the signal processing unit 101 generates correction image data based on the plurality of accumulation signals S1 and S2 nondestructively read out from the holding unit SH over a plurality of times while the holding unit SH holds accumulation signals. Performing image capturing accompanying the accumulation period T only once and reading out accumulation signals over a plurality of times can obtain correction image data in a short time as compared with the case of repeating image capturing and readout of accumulation signals. In addition, in this embodiment, correction image data and radiation image data can be obtained with the two types of sensitivities in one frame period F.

A control method (driving method) for a radiation imaging apparatus according the third embodiment of the present invention will be described with reference to FIGS. 12 and 13. The configurations of a radiation imaging apparatus 100 and a radiation imaging system SYS may be the same as those of the first embodiment, and hence a description of the configurations will be omitted. The third embodiment will exemplify a case in which a plurality of types of dark image are generated by obtaining a plurality of types of accumulation signals with different accumulation periods T by one image capturing operation after one reset driving operation and before the next reset driving operation.

Figure 12:
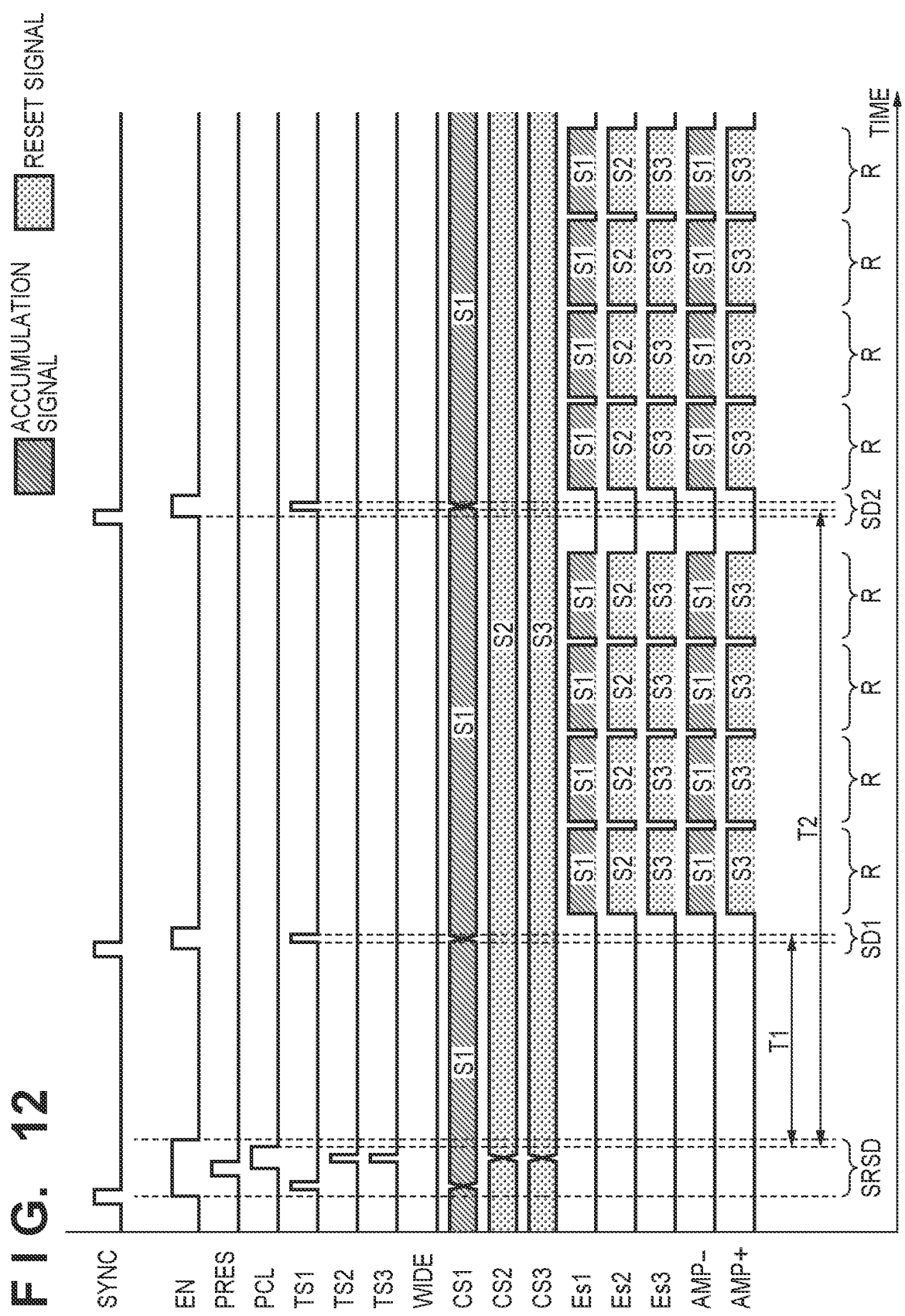
FIG. 12 is a timing chart showing a driving method for generating correction image data using the radiation imaging apparatus in FIG. 1.
Figure 13:
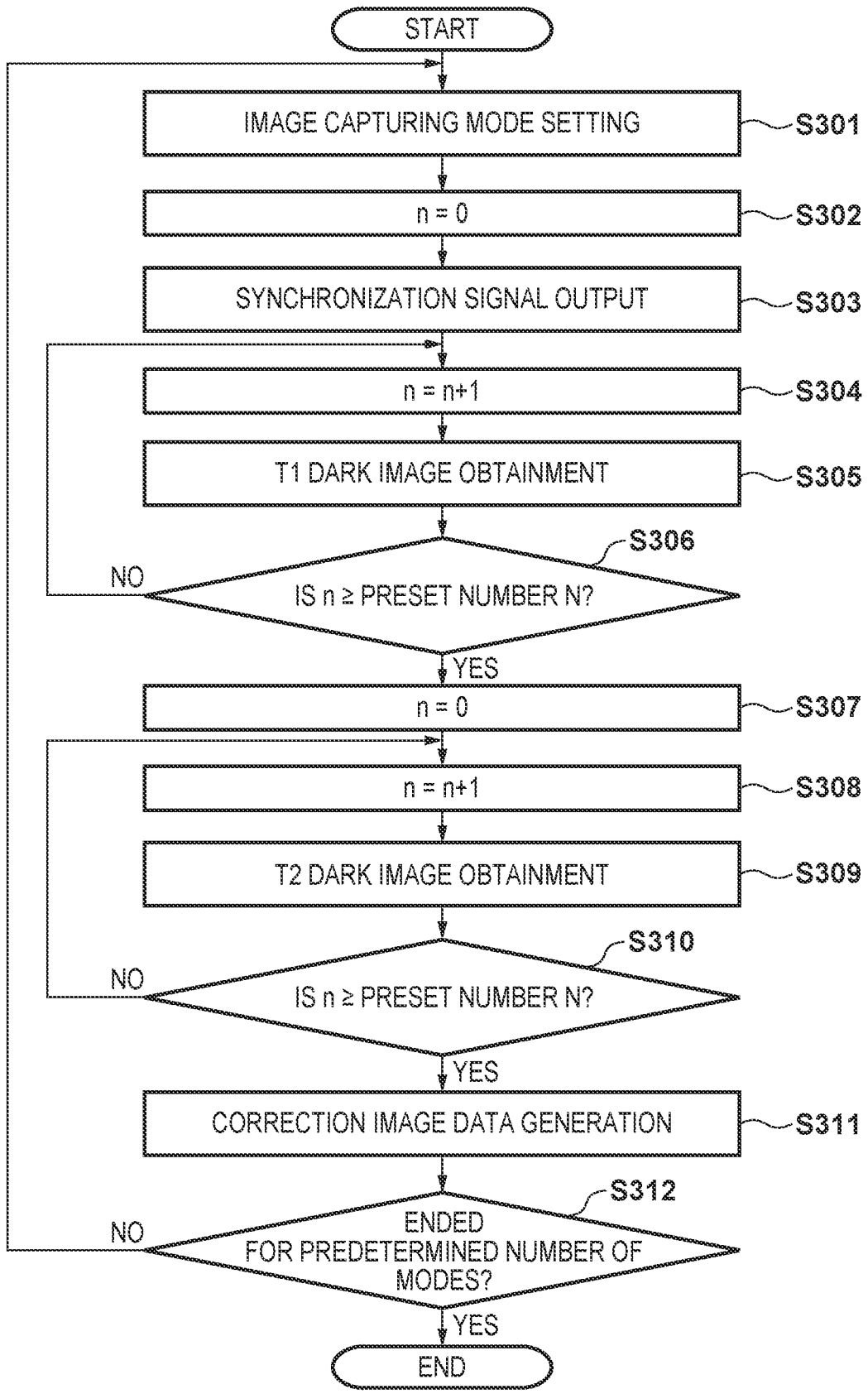
FIG. 13 is a flowchart showing the driving method for generating a radiation image using the radiation imaging apparatus in FIG. 1.

FIG. 12 is a timing chart showing an example of a driving method of generating two types of dark images with different accumulation periods by one image capturing operation. For the sake of simplicity, FIG. 12 explains a case in which an image capturing mode without an additional capacitor Cfd' is set. However, the embodiment may be configured to generate dark images with different sensitivities by connecting the additional capacitor Cfd' as in the second embodiment described above.

First of all, an image capturing mode is set before image capturing. In this image capturing mode, the sensitivity of a pixel P corresponds to a sensitivity set with only an FD capacitor Cfd without an additional capacitor Cfd'. As in the timing chart in the first embodiment shown in FIGS. 4 and 5, therefore, a panel control unit 109 inactivates a control signal WIDE. In addition, the panel control unit 109 makes settings for driving to generate two types of dark images with different accumulation periods T by one image capturing operation before image capturing. More specifically, upon detecting the leading edge of a pulse of a first synchronization signal SYNC, the panel control unit 109 performs driving SRSD so as to perform driving SD1 at the leading edge of a pulse of a second synchronization signal SYNC and perform driving SD2 at the leading edge of a pulse of a third synchronization signal SYNC.

The driving SRSD will be described. A description of each driving operation which is redundant to that in the first embodiment described above will be omitted as appropriate. The panel control unit 109 collectively performs the driving SRSD (to be described below) with respect to all the pixels P included in an image capturing panel 105. The driving SRSD indicates sample/hold driving and reset driving executed in accordance with the first synchronization signal SYNC.

Upon detecting the leading edge of a pulse of the first synchronization signal SYNC in image capturing performed without irradiation with radiation, the panel control unit 109 starts the driving SRSD. When the driving SRSD is performed, an accumulation signal is held in a holding capacitor CS1 of a holding unit SH1. In addition, reset signals are held in holding capacitors CS2 and CS3 of holding units SH2 and SH3. However, the accumulation signal held in the holding capacitor CS1 is not necessary as in each embodiment described above, and hence no pixel signal is read out.

A signal processing unit 101 outputs the synchronization signal SYNC to the panel control unit 109 so as to make the accumulation period of dark electric charge become an accumulation period T1. Upon detecting the leading edge of a pulse of the next SYNC signal, the panel control unit 109 starts the driving SD1 to obtain the accumulation signal accumulated in the accumulation period T1.

First of all, the panel control unit 109 activates an enable signal EN, and then temporarily activates a control signal TS1. With this operation, a transfer transistor M8 is switched from a nonconductive state to a conductive state, and an accumulation signal S1 accumulated in the accumulation time of the accumulation period T1 is transferred to the holding capacitor CS1 of the holding unit SH1 and held (sampled) in the holding capacitor CS1. Thereafter, the panel control unit 109 inactivates the enable signal EN, and finishes the driving SD1.

At the end time of the driving SD1, the accumulation signal S1 in the accumulation period T1 is held in the holding capacitor CS1, and reset signals S2 and S3 based on a clamp voltage VCL as a predetermined potential are held in the holding capacitors CS2 and CS3 of the holding units SH2 and SH3. Accordingly, the panel control unit 109 starts reading out the accumulation signal S1 and the reset signal S3 held in the holding capacitor CS1 and CS3 after the lapse of a predetermined time since the end of the driving SD1. The accumulation signal S1 held in the holding capacitor CS1 of the holding unit SH1 by the driving SD1 is sometimes called the first signal. Repeating a nondestructive readout operation in the period R with respect to the signals accumulated in the accumulation period T1 over a plurality of times will obtain a plurality of accumulation signals.

Upon obtaining a plurality of accumulation signals in the accumulation period T1, the signal processing unit 101 outputs the synchronization signal SYNC to the panel control unit 109 so as to set the accumulation period of dark electric charge to an accumulation period T2 longer than the accumulation period T1. Upon detecting the leading edge of a pulse of the next SYNC signal, the panel control unit 109 starts the driving SD2 for generating dark images accumulated in the accumulation period T2.

The panel control unit 109 performs an operation in the driving SD2 which is similar to that in the driving SD1. At the end of the driving SD2, the accumulation signal S1 in the accumulation period T2 is held in the holding capacitor CS1, and the reset signals S2 and S3 based on the clamp voltage VCL as a predetermined potential are held in the holding capacitors CS2 and CS3 of the holding units SH2 and SH3. The accumulation signal S1 sampled by the driving SD2 in the accumulation period T2 longer than the accumulation period T1, which is held in the holding capacitor CS1 of the holding unit SH1, is sometimes called the second signal. After the lapse of a predetermined time since the end of the driving SD2, the panel control unit 109 starts reading out the accumulation signal S1 and the reset signal S3 held in the holding capacitors CS1 and CS3. The panel control unit 109 obtains a plurality of accumulation signals by repeating nondestructive readout in the period R with respect to the signal accumulated in the accumulation period T2 over a plurality of times.

An operation for generating correction image data will be described next with reference to FIG. 13.

In step S301, the signal processing unit 101 issues a control command to the panel control unit 109 of the radiation imaging apparatus 100 via a control interface 110 in accordance with the setting made by the user. This sets image capturing modes with two different types of accumulation periods T including an accumulation period T1 and an accumulation period T2. In step S302, the signal processing unit 101 resets an image capturing counter n in the signal processing unit 101 to 0, and starts the processing of generating an accumulation image as a source of correction image data.

In step S303, the signal processing unit 101 outputs the synchronization signal pulse SYNC to the panel control unit 109 via a synchronization signal 113. Because correction image data is generated based on a dark image, the radiation generation apparatus 104 does not perform irradiation with radiation. In step S304, the signal processing unit 101 increments the image capturing counter n.

In step S305, upon receiving the synchronization signal pulse SYNC via the synchronization signal 113, the panel control unit 109 drives the image capturing panel 105 and the signal readout unit 20 in accordance with the timing chart shown in FIG. 12. The panel control unit 109 A/D-converts the accumulation signal and the reset signal held in each pixel P in the accumulation period T1, and transfers the resultant data as pixel data to the signal processing unit 101 via the image data interface 111. The signal processing unit 101 generates an accumulation image (dark image) in the accumulation period T1 based on the transferred pixel data. The signal processing unit 101 stores the nth dark image in the accumulation period T1 in a storage unit 115.

In step S306, the signal processing unit 101 determines whether the number of dark images obtained has reached a preset number N in the image capturing mode set by image capturing mode setting. If the number of dark images obtained has reached the preset number N (YES in step S306), the signal processing unit 101 advances the process to step S307. If the number of dark images obtained has not reached the preset number N (NO in step S306), the signal processing unit 101 returns the process to step S304.

If the number of dark images obtained in the accumulation period T1 has reached the preset number N, the signal processing unit 101 resets the image capturing counter n in the signal processing unit 101 to 0 and starts the processing of generating an accumulation image in the accumulation period T2 as a source of correction image data in step S307.

In step S308, the signal processing unit 101 increments the image capturing counter n. Subsequently, because correction image data is generated based on a dark image, a radiation generation apparatus 104 does not perform irradiation with radiation.

In step S309, upon receiving the synchronization signal pulse SYNC via the synchronization signal 113, the panel control unit 109 drives the image capturing panel 105 and a signal readout unit 20 in accordance with the timing chart shown in FIG. 12. The panel control unit 109 A/D-converts the accumulation signal and the reset signal in the accumulation period T2 which are held in each pixel P, and transfers the resultant data as pixel data to the signal processing unit 101 via an image data interface 111. The signal processing unit 101 generates an accumulation image (dark image) in the accumulation period T2 based on the transferred pixel data. The signal processing unit 101 stores the nth dark image in the accumulation period T2 in a storage unit 115.

In step S310, the signal processing unit 101 determines whether the number of dark images obtained has reached a preset number N in the image capturing mode set by image capturing mode setting. If the number of dark images obtained has reached the preset number N (YES in step S310), the signal processing unit 101 advances the process to step S311. If the number of dark images obtained has not reached the preset number N (NO in step S310), the signal processing unit 101 returns the process to step S308.

If the number of dark images obtained in the accumulation period T2 has reached the preset number N, the signal processing unit 101 generates one each of images in the accumulation period T1 and the accumulation period T2 by averaging the N dark images in each of the accumulation periods T1 and T2 in step S311. The signal processing unit 101 stores, in the storage unit 115, these images as correction image data for the accumulation period T1 and the accumulation period T2.

In step S312, the signal processing unit 101 determines whether correction image data has been obtained by the types of image capturing modes used for image capturing by the radiation imaging system SYS. If correction image data has not been obtained by the required types (NO in step S312), the signal processing unit 101 returns the process to step S301 to generate correction image data by the required types. If correction image data has been obtained by the required types (YES in step S312), the signal processing unit 101 terminates the processing for generating correction image data.

In the above manner, correction image data corresponding to two types of image capturing modes are generated during one image capturing operation after one reset driving operation and before the next reset driving operation, thus improving the efficiency in generating correction image data. In this embodiment, two types of correction image data are generated. However, this is not exhaustive. For example, after accumulation signals in the accumulation period T2 are nondestructively read out over a plurality of times, accumulation signals in the accumulation period T3 longer than the accumulation period T2 may be sampled in the holding unit SH and may nondestructively read out afterward. In addition, accumulation signals in four or more types of accumulation periods T may be read out.

A control method (driving method) for a radiation imaging apparatus according to the fourth embodiment of the present invention will be described with reference to FIGS. 14 and 15. The third embodiment described above has exemplified the method of generating a plurality of dark images with the different accumulation periods T. However, this method cannot be applied to a case in which the difference between the accumulation period T1 and the accumulation period T2 is shorter than the period during which a plurality of readout operations are performed. The fourth embodiment will exemplify a driving method that can be applied to even a case in which the difference between the accumulation period T1 and the accumulation period T2 is shorter than the period during which a plurality of readout operations are performed. The configurations of a radiation imaging apparatus 100 and a radiation imaging system SYS may be the same as those of each embodiment described above, and hence a description of the configurations will be omitted.

Figure 14:
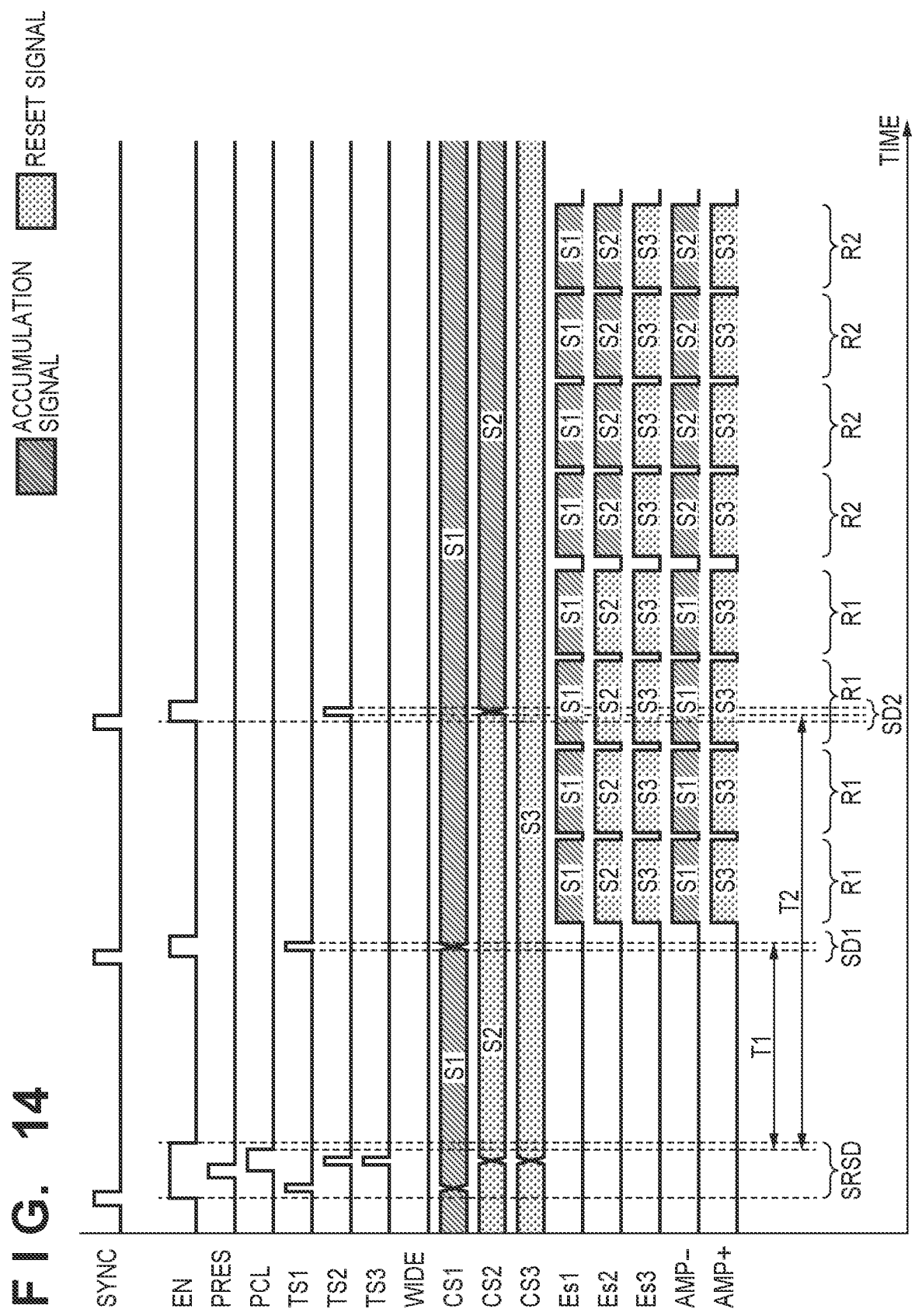
FIG. 14 is a timing chart showing a driving method for generating correction image data using the radiation imaging apparatus in FIG. 1.

FIG. 14 is a timing chart showing an example of a driving method of obtaining a plurality of types of dark images with different accumulation periods T by performing image capturing once after one reset driving operation and before the next reset driving operation using a plurality of holding capacitors CS. For the sake of simplicity, FIG. 14 explains a case in which an image capturing mode without an additional capacitor Cfd' is set.

First of all, an image capturing mode is set before image capturing. In this image capturing mode, the sensitivity of a pixel P corresponds to a sensitivity set with only an FD capacitor Cfd without an additional capacitor Cfd'. As in the timing chart in the first embodiment shown in FIGS. 4 and 5, therefore, a panel control unit 109 inactivates a control signal WIDE. In addition, the panel control unit 109 makes settings for driving to generate two types of dark images with different accumulation periods T by one image capturing operation before image capturing. More specifically, upon detecting the leading edge of a pulse of a first synchronization signal SYNC, the panel control unit 109 performs driving SRSD so as to perform driving SD1 at the leading edge of a pulse of a second synchronization signal SYNC and perform driving SD2 at the leading edge of a pulse of a third synchronization signal SYNC.

The driving SRSD will be described. A description of each driving operation which is redundant to that in the first embodiment described above will be omitted as appropriate. The panel control unit 109 collectively performs the driving SRSD (to be described below) with respect to all the pixels P included in an image capturing panel 105. The driving SRSD indicates sample/hold driving and reset driving executed in accordance with the first synchronization signal SYNC.

Upon detecting the leading edge of a pulse of the first synchronization signal SYNC in image capturing performed without irradiation with radiation, the panel control unit 109 starts the driving SRSD. When the driving SRSD is performed, an accumulation signal is held in a holding capacitor CS1 of a holding unit SH1. In addition, reset signals are held in holding capacitors CS2 and CS3 of holding units SH2 and SH3. However, the accumulation signal held in the holding capacitor CS1 is not necessary as in each embodiment described above, and hence no pixel signal is read out.

A signal processing unit 101 outputs the synchronization signal SYNC to the panel control unit 109 so as to make the accumulation period of dark electric charge become an accumulation period T1. Upon detecting the leading edge of a pulse of the next SYNC signal, the panel control unit 109 starts the driving SD1 to obtain the accumulation signal accumulated in the accumulation period T1.

First of all, the panel control unit 109 activates an enable signal EN, and then temporarily activates a control signal TS1. With this operation, a transfer transistor M8 is switched from a nonconductive state to a conductive state, and the accumulation signal S1 accumulated in the accumulation time of the accumulation period T1 is transferred to the holding capacitor CS1 of the holding unit SH1 and held (sampled) in the holding capacitor CS1. Thereafter, the panel control unit 109 inactivates the enable signal EN and finishes the driving SD1.

At the end time of the driving SD1, the accumulation signal S1 in the accumulation period T1 is held in the holding capacitor CS1, and the reset signals S2 and S3 based on the clamp voltage VCL as a predetermined potential are held in the holding capacitors CS2 and CS3 of the holding units SH2 and SH3. Accordingly, the panel control unit 109 starts reading out the accumulation signal S1 and the reset signal S3 held in the holding capacitors CS1 and CS3 after the lapse of a predetermined time since the end of the driving SD1. The accumulation signal S1 held in the holding capacitor CS1 of the holding unit SH1 by the driving SD1 is sometimes called the first signal. A plurality of accumulation signals S1 are obtained by repeating a nondestructive readout operation in the period R1 with respect to the signal accumulated in the accumulation period T1 over a plurality of times.

Upon obtaining an accumulation signal in the accumulation period T1, the signal processing unit 101 outputs the synchronization signal SYNC to the panel control unit 109 so as to set an accumulation period of dark electric charge to an accumulation period T2 longer than the accumulation period T1. Upon detecting the leading edge of a pulse of the next SYNC signal, the panel control unit 109 starts the driving SD2 for generating a dark image accumulated in the accumulation period T2.

First of all, the panel control unit 109 activates the enable signal EN, and then temporarily activates the control signal TS2. With this operation, the transfer transistor M8 is switched from a nonconductive state to a conductive state, and the accumulation signal S2 accumulated in the accumulation period T2 is transferred to the holding capacitor CS2 and held in the holding capacitor CS2. Thereafter, the panel control unit 109 inactivates the enable signal EN and finishes the driving SD2.

At the end time of the driving SD2, the accumulation signal S2 in the accumulation period T2 is held in the holding capacitor CS2, and the reset signal S3 based on a clamp voltage VCL as a predetermined potential is held in the holding capacitor CS3. The accumulation signal S2 sampled by the driving SD2 in the accumulation period T2 longer than the accumulation period T1, which is held in the holding capacitor CS2 of the holding unit SH2, is sometimes called the second signal. After the driving SD2 finishes and a plurality of periods R1 as readout operations in the accumulation period T1 finish, the panel control unit 109 starts a period R2 to read out the accumulation signal S2 and the reset signal S3 held in the holding capacitors CS2 and CS3. The panel control unit 109 obtains a plurality of accumulation signals S2 by repeating nondestructive readout in the period R2 with respect to the signals accumulated in the accumulation period T2 over a plurality of times.

An operation for generating correction image data will be described next with reference to FIG. 15. Differences from the third embodiment will be mainly described below.

Figure 15:
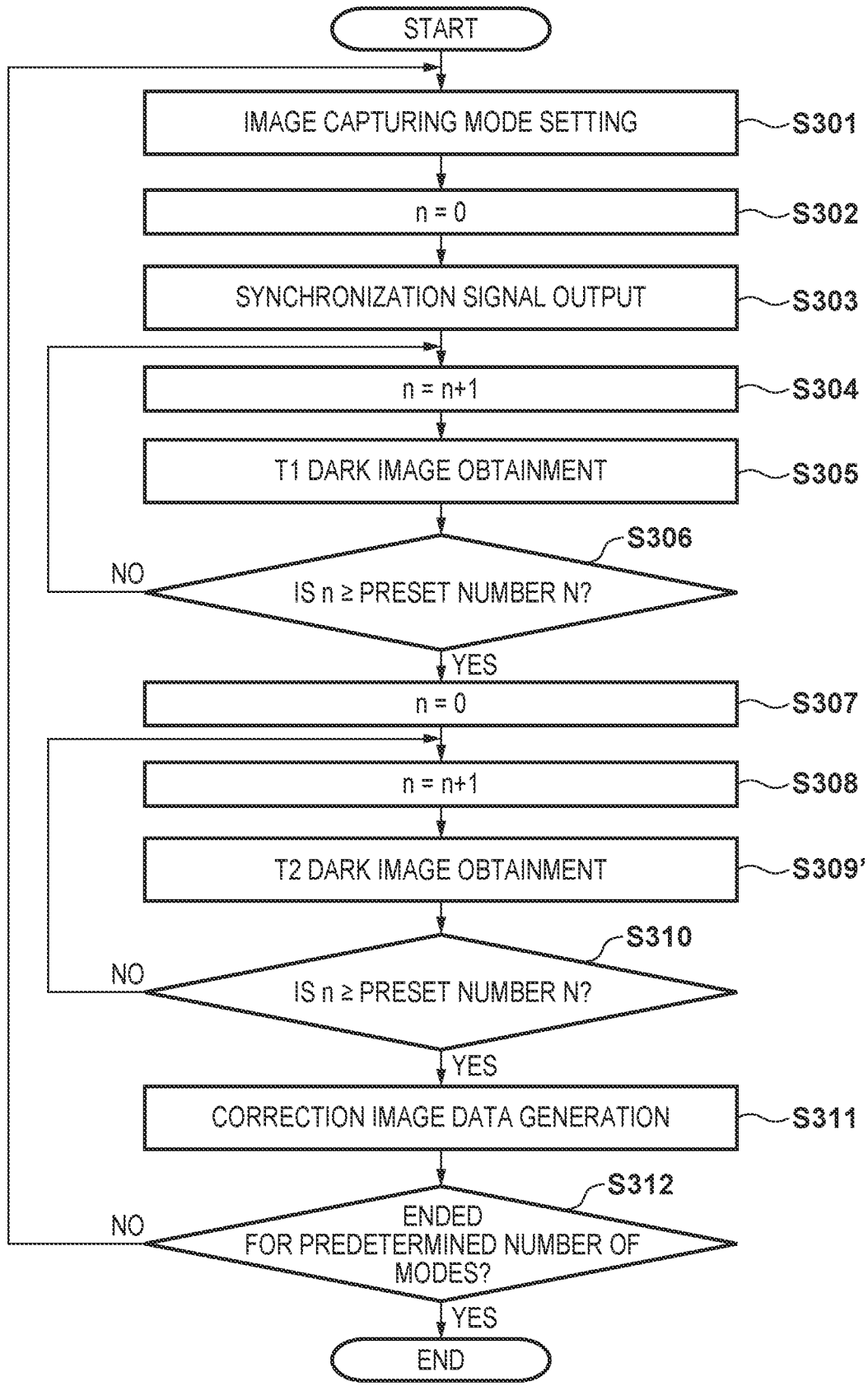
FIG. 15 is a flowchart showing the driving method for generating radiation image data using the radiation imaging apparatus in FIG. 1.

The processing in steps S301 to S308 in FIG. 15 is the same as that in the third embodiment described above. The panel control unit 109 drives the image capturing panel 105 and a signal readout unit 20 in accordance with the timing chart shown in FIG. 14 instead of the timing chart of FIG. 12 according to the third embodiment.

In step S309', upon completion of a preset number of periods R1 to read out the accumulation signals S1 in the accumulation period T1, the panel control unit 109 drives the image capturing panel 105 and the signal readout unit 20 in accordance with the timing chart shown in FIG. 14. The panel control unit 109 A/D-converts the accumulation signal S2 and the reset signal S3 in the accumulation period T2, which are held in each pixel P, and transfers the resultant data as pixel data to the signal processing unit 101 via an image data interface 111. The signal processing unit 101 generates an accumulation image (dark image) based on the transferred pixel data. The signal processing unit 101 stores the nth dark image in the accumulation period T2 in a storage unit 115. The processing in steps S310 to S312 in FIG. 15 is the same as that in the third embodiment described above.

In this embodiment, using a plurality of holding capacitors CS of holding units SH during one image capturing operation after one reset driving operation and before the next reset driving operation can generate offsets for a plurality of image capturing modes with different accumulation periods T. This makes it possible to perform efficient generation of correction image data, which can be applied to a combination of various accumulation periods.

As described above, the radiation imaging apparatus 100 that can perform image capturing in a plurality of image capturing modes, such as two or more image capturing modes of performing image capturing with different sensitivities and two or more image capturing modes of performing image capturing in different accumulation periods, can generate and obtain correction image data in a short time. This makes it possible to shorten, for example, the time between the instant the apparatus is activated and the instant the apparatus becomes ready for image capturing. In addition, because correction image data can be generated in a short time between image capturing operations, for example, increasing the frequency of updating correction image data makes it possible to improve the accuracy of offset correction of obtained radiation images.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-005946, filed Jan. 17, 2018, which is hereby incorporated by reference herein in its entirety.

What is claimed is:

1. A radiation imaging apparatus comprising:
an image capturing unit configured to capture a radiation image, wherein the image capturing unit includes a plurality of pixels each including a conversion unit configured to convert radiation into electric charge and a holding unit configured to hold a signal corresponding to electric charge of the conversion unit, and the holding unit holds an accumulated signal corresponding to electric charge accumulated in the conversion unit by one image capturing operation without irradiation with radiation; and
a signal processing unit, wherein
the signal processing unit generates correction image data based on a plurality of first signals obtained by reading the accumulated signal from the holding unit nondestructively over a plurality of times while the holding unit holds the accumulated signal, and corrects radiation image data captured by the image capturing unit during irradiation with radiation by using the correction image data.

2. The apparatus according to claim 1, wherein the image capturing unit further includes a reset unit and an amplification unit, the amplification unit is arranged between the conversion unit and the holding unit and amplifying a signal output from the conversion unit, the holding unit holds the accumulated signal and a reset signal corresponding to electric charge of the amplification unit when the reset unit resets the conversion unit and the amplification unit, and the signal processing unit generates the correction image data based on differences between the plurality of first signals and a plurality of second signals obtained by reading the reset signal from the holding unit nondestructively over a plurality of times while the holding unit holds the accumulated signal and the reset signal.

3. The apparatus according to claim 2, wherein the holding unit includes a first holding capacitor configured to hold the accumulated signal and a second holding capacitor configured to hold the reset signal.

4. The apparatus according to claim 1, wherein the conversion unit includes a first capacitor configured to accumulate electric charge and a second capacitor configured to switch sensitivities of the image capturing unit, the accumulated signal is a first accumulated signal, the holding unit holds the first accumulated signal corresponding to a voltage generated in the first capacitor by first electric charge accumulated in the conversion unit by the one image capturing operation and holds a second accumulated signal corresponding to a voltage generated in a combined capacitor of the first capacitor and the second capacitor by the first electric charge, and the signal processing unit generates the correction image data respectively based on the plurality of first signals obtained by reading the first accumulated signal from the holding unit nondestructively over a plurality of times and a plurality of second signals obtained by reading the second accumulated signal from the holding unit nondestructively over a plurality of times while the holding unit holds the first accumulated signal and the second accumulated signal.

5. The apparatus according to claim 1, wherein the accumulated signal is a first accumulated signal, the holding unit holds the first accumulated signal sampled from the conversion unit in a first accumulation period and holds a second accumulated signal sampled in a second accumulation period longer than the first accumulation period in the one image capturing operation, and the signal processing unit generates the correction image data respectively based on the plurality of first signals obtained by reading the first accumulated signal from the holding unit nondestructively over a plurality of times and a plurality of second signals obtained by reading the second accumulated signal from the holding unit nondestructively over a plurality of times while the holding unit holds the first accumulated signal and the second accumulated signal.

6. The apparatus according to claim 5, wherein the holding unit samples the second accumulated signal after the signal processing unit reads out the first accumulated signal.

7. The apparatus according to claim 5, wherein the holding unit samples the second accumulated signal while the signal processing unit reads out the first accumulated signal.

8. The apparatus according to claim 4, wherein the holding unit includes a first holding capacitor configured to hold the first accumulated signal and a second holding capacitor configured to hold the second accumulated signal.

9. The apparatus according to claim 4, wherein the image capturing unit further includes a reset unit and an amplification unit, the amplification unit is arranged between the conversion unit and the holding unit and amplifies a signal output from the conversion unit, the holding unit holds the first accumulated signal, the second accumulated signal, and a reset signal corresponding to electric charge of the amplification unit when the reset unit resets the conversion unit and the amplification unit, and the signal processing unit generates the correction image data respectively based on differences between the plurality of first signals and a plurality of third signals obtained by reading the reset signal from the holding unit nondestructively over a plurality of times and differences between the plurality of second signals and the plurality of third signals while the holding unit holds the first accumulated signal, the accumulated second signal and the reset signal.

10. The apparatus according to claim 9, wherein the holding unit includes a first holding capacitor configured to hold the first accumulated signal, a second holding capacitor configured to hold the second accumulated signal, and a third holding capacitor configured to hold the reset signal.

11. The apparatus according to claim 1, wherein the apparatus is configured to perform image capturing in a plurality of image capturing modes and further includes a storage unit, the signal processing unit generates a plurality of types of the correction image data corresponding to image capturing in the plurality of image capturing modes which is performed by the image capturing unit, and stores the plurality of types of the correction image data in the storage unit, and the radiation image data is corrected by using correction image data, of the plurality of types of the correction imaged data stored in the storage unit, which corresponds to an image capturing mode in which the radiation image data is captured.

12. The apparatus according to claim 11, wherein the plurality of image capturing modes include at least not less than two image capturing modes of performing image capturing with different sensitivities or not less than two image capturing modes of performing image capturing in different accumulation periods.

13. A control method for a radiation imaging apparatus including an image capturing unit configured to capture a radiation image and a signal processing unit, the image capturing unit having a plurality of pixels each including a conversion unit configured to convert radiation into electric charge and a holding unit configured to hold a signal corresponding to electric charge of the conversion unit, the method comprising the steps of:

causing the holding unit to hold an accumulated signal corresponding to electric charge accumulated in the conversion unit by one image capturing operation without irradiation with radiation;

causing the signal processing unit to generate correction image data based on a plurality of first signals obtained by reading the accumulated signal from the holding unit nondestructively over a plurality of times while the holding unit holds the accumulated signal; and causing the signal processing unit to correct radiation image data captured by the image capturing unit during irradiation with radiation by using the correction image data.

14. A non-transitory computer-readable storage medium storing a program for causing a computer to execute a control method for a radiation imaging apparatus including an image capturing unit configured to capture a radiation image and a signal processing unit, the image capturing unit having a plurality of pixels each including a conversion unit configured to convert radiation into electric charge and a holding unit configured to hold a signal corresponding to electric charge of the conversion unit, wherein
    the method comprises causing the holding unit to hold an accumulated signal corresponding to electric charge accumulated in the conversion unit by one image capturing operation without irradiation with radiation,
    causing the signal processing unit to generate correction image data based on a plurality of first signals obtained by reading the accumulated signal from the holding unit nondestructively over a plurality of times while the holding unit holds the accumulated signal, and
    causing the signal processing unit to correct radiation image data captured by the image capturing unit during irradiation with radiation by using the correction image data.

\* \* \* \* \*